(12) United States Patent
Badger et al.

(10) Patent No.: US 7,159,893 B2
(45) Date of Patent: *Jan. 9, 2007

(54) TENT ASSEMBLY FOR USE WITH UTILITY TRAILERS AND VEHICLES

(75) Inventors: William A. Badger, Salt Lake City, UT (US); Robert J. T. Badger, Salt Lake City, UT (US); John T. Badger, Salt Lake City, UT (US)

(73) Assignee: Jumping Jack, Inc., Salt Lake City, UT (US)

( * ) Notice: Subject to any disclaimer, the term of this patent is extended or adjusted under 35 U.S.C. 154(b) by 159 days.

This patent is subject to a terminal disclaimer.

(21) Appl. No.: 10/318,936

(22) Filed: Dec. 13, 2002

(65) Prior Publication Data

US 2003/0173758 A1 Sep. 18, 2003

Related U.S. Application Data

(63) Continuation-in-part of application No. 10/108,133, filed on Mar. 27, 2002.

(60) Provisional application No. 60/364,537, filed on Mar. 14, 2002.

(51) Int. Cl.
*B62D 63/06* (2006.01)

(52) U.S. Cl. .................. 280/656; 280/415.1; 296/160; 296/169

(58) Field of Classification Search ............... 280/656, 280/401, 415.1; 296/173, 174, 159, 160, 296/169

See application file for complete search history.

(56) References Cited

U.S. PATENT DOCUMENTS

| | | | |
|---|---|---|---|
| 1,385,437 A * | 7/1921 | Ellerman | 296/172 |
| 2,719,054 A * | 9/1955 | Jennings | 296/169 |
| 3,652,122 A | 3/1972 | Beauregard | 296/23 |
| 3,715,141 A | 2/1973 | Cary | 296/23 |
| 3,917,337 A | 11/1975 | Couix | 296/23 |
| 4,014,586 A | 3/1977 | Swofford | 296/23 |
| 4,113,301 A | 9/1978 | Olmstead | 296/23 |
| 4,863,212 A | 9/1989 | Jansen | 296/173 |
| 5,080,426 A | 1/1992 | Johnson | 296/161 |
| 5,135,278 A | 8/1992 | Kauffman et al. | 296/26 |
| 5,462,330 A | 10/1995 | Brown | 296/172 |
| 5,544,671 A | 8/1996 | Phillips | 135/88.14 |
| 5,558,392 A | 9/1996 | Young | 296/157 |
| 5,567,003 A | 10/1996 | Gill | 296/173 |

(Continued)

*Primary Examiner*—Jeff Restifo
(74) *Attorney, Agent, or Firm*—Kirton & McConkie; Michael F. Krieger

(57) ABSTRACT

The present invention features a combination utility/camper trailer capable of being converted between a first utility functioning configuration or position, a second utility functioning configuration or position, and a sleep functioning configuration or position via means for repositioning, which allows first and second configurable panel members to be relocated or repositioned between these positions. In the first utility functioning position, the combination utility/camper trailer is capable of supporting and carrying a load atop the panel members, while simultaneously providing storage in the trailer bed below. In the second utility functioning configuration, the trailer is configured to increase the volume of the interior storage portion of the trailer bed by positioning first and second configurable panel members in an upward extending manner. In the sleep functioning position, the combination utility/camper trailer is converted into a tent trailer by positioning first and second configurable panel members in an outward position and removably coupling a unique tent assembly to the combination utility/camper trailer to provide an enclosed sleeping area in which each panel member functions to provide a bed or sleeping area.

25 Claims, 23 Drawing Sheets

U.S. PATENT DOCUMENTS

| | | | |
|---|---|---|---|
| 5,595,414 A | 1/1997 | Dulnig et al. | 296/26.02 |
| 5,758,679 A | 6/1998 | Tamburelli | 135/88.09 |
| 5,761,854 A | 6/1998 | Johnson et al. | 52/69 |
| 5,884,824 A | 3/1999 | Spring, Jr. | 224/310 |
| 5,915,400 A * | 6/1999 | Pohl et al. | 135/125 |
| 5,988,731 A | 11/1999 | Eischen | 296/159 |
| 6,007,142 A | 12/1999 | Gehman et al. | 296/171 |
| 6,017,080 A | 1/2000 | Gill | 296/173 |
| 6,017,081 A | 1/2000 | Colby | 296/173 |
| 6,102,468 A | 8/2000 | Lowrey et al. | 296/173 |
| 6,135,526 A | 10/2000 | Reckner, Jr. | 296/37.13 |
| 6,203,097 B1 | 3/2001 | Podgorney | 296/170 |
| 6,217,106 B1 | 4/2001 | Reckner, Jr. | 296/173 |
| 6,283,537 B1 | 9/2001 | DeVore, III | 296/181 |
| 6,296,297 B1 | 10/2001 | Barrow et al. | 296/173 |

* cited by examiner

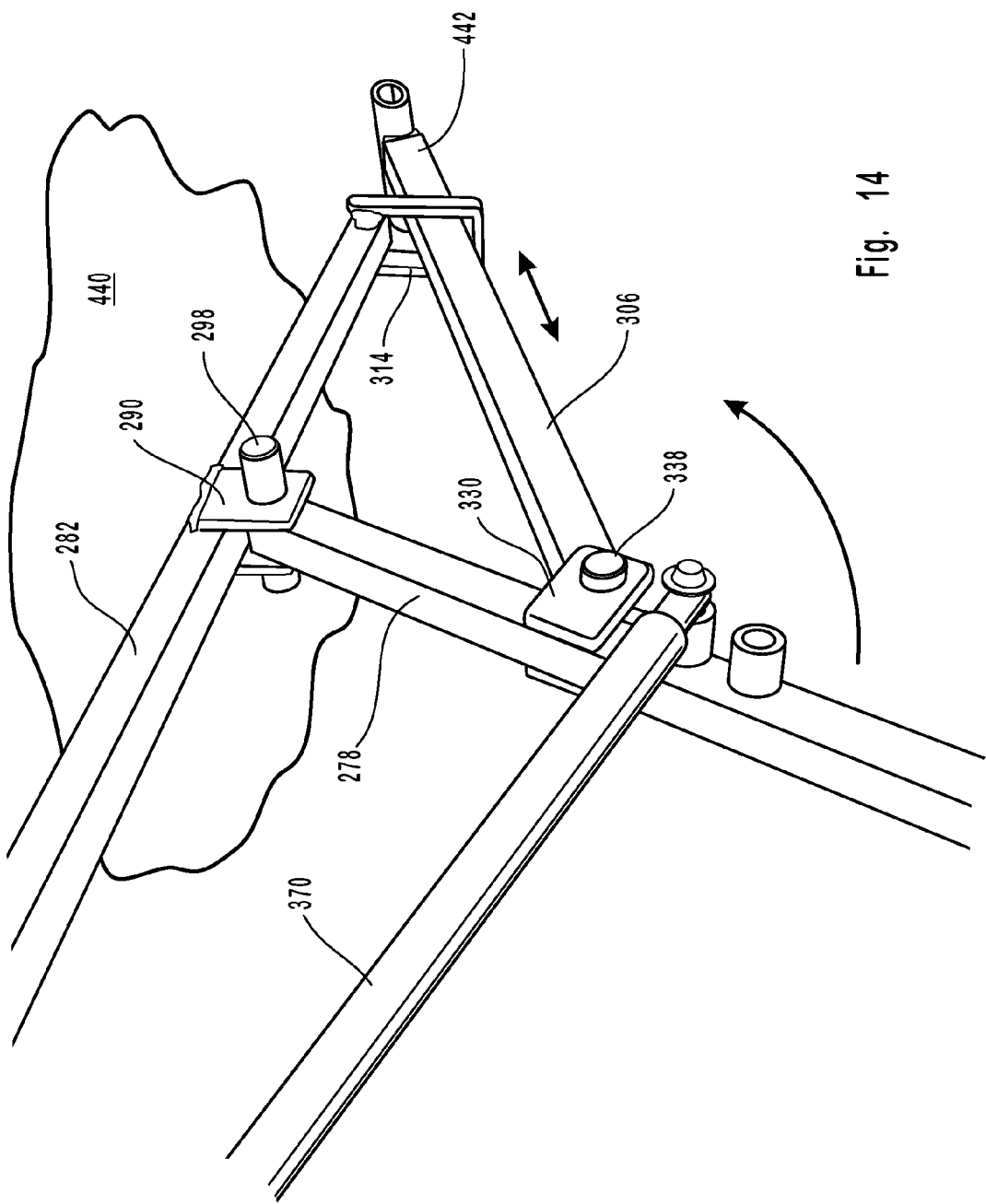

TENT ASSEMBLY FOR USE WITH UTILITY TRAILERS AND VEHICLES

RELATED APPLICATIONS

The present application is a continuation in part application and claims priority to U.S. patent application Ser. No. 10/108,133, filed on Mar. 27, 2002, and entitled, "Convertible combination utility/camper tow trailer." The present invention further claims priority to U.S. Provisional Application Ser. No. 60/364,537, filed on Mar. 14, 2002 and entitled, "Convertible Combination Utility/Camper Tow Trailer."

BACKGROUND

1. Field of Invention

The present invention relates to tow trailers and tent assemblies, and particularly to a combination utility/camper trailer comprising a single, integrated concept in which the combination utility/camper trailer is capable of converting back and forth between several configurations to function both as a utility trailer or a camper using the unique tent assembly described herein.

2. Background of the Invention

In recent years, the popularity of camping has increased. Many are flocking to the great outdoors to enjoy its beauty and to escape the drudgery of work and stress filled days. As such, many are purchasing various types of campers, camping trailers, motor homes, etc. to enable them to experience the outdoors in comfort, yet still achieve a desired and reasonable sense of "getting away."

Moreover, due to the large increase in popularity of recreational-type vehicles, many are purchasing ATV's, motorcycles, water craft, etc. to help them enjoy the outdoors even more. In order to do so however, some type of transporting means, such as a utility trailer, is required to haul these recreational vehicles to their intended destination. In a similar manner, those not owning recreational vehicles may have other items that may need to be hauled and transported to a particular site.

In the past, if one desired to take a camping trip with a camper trailer, as well as desiring to bring along one or more recreational vehicles or some other type of cargo load, it was required to have the camper trailer independent of the utility trailer and to pack up and bring along both.

Camper trailers are well known in the art, as are utility trailers. However, camper trailers and utility trailers serve to perform their intended functions with little variance as to being able to provide anything more. A camper trailer may certainly haul various camping gear and other paraphernalia, etc., but a camper trailer is limited in its ability to do so and is not particularly suited for such a purpose. A camper trailer is however, certainly unable to carry heavy and bulky loads, such as an ATV. Likewise, utility trailers are suited mainly for accepting and hauling loads of various size and weight. Utility trailers are ideal for hauling ATV's and other large and heavy items, but are not too particularly suited for sleeping in. As such, it is not uncommon for someone to be seen having multiple trailers to fulfill their needs.

In addition to the inconvenience experienced of towing multiple trailers during a camping expedition, there is an additional downside to prior art tow trailers. It becomes extremely expensive to purchase multiple trailers to fulfill the needs and accommodate the desires of individuals wishing to own a camper trailer as well as a utility trailer.

SUMMARY AND OBJECTS OF THE INVENTION

Based on the foregoing, there is a need for a trailer that may convert back and forth between a utility trailer and a camping trailer with little effort, and without sacrificing any of the benefits in each of these respective stand alone trailer types.

Therefore, it is an object of some embodiments of the present invention to provide a combination utility/camper trailer that combines the benefits and advantages of utility-type trailers as well as camping trailers in a single, fully integrated, easy to use combination utility/camper trailer.

It is another object of some embodiments of the present invention to provide a combination utility/camper trailer capable of providing multiple functional configurations.

It is still another object of some embodiments of the present invention to provide a combination utility/camper trailer capable of converting between a utility trailer and a camping trailer with little effort.

It is a further object of some embodiments of the present invention to provide a combination utility/camper trailer that accepts a tent assembly when in a sleep functioning configuration in order to provide an enclosed sleeping area.

It is still a further object of some embodiments of the present invention to provide a unique tent assembly that works in connection with the utility/camper trailer and that is easily transitioned from a stored position to a collapsed position.

In accordance with the invention as embodied and broadly described herein, the present invention features a combination utility/camper trailer capable of being towed by a motorized vehicle, and particularly a combination utility/camper trailer comprising a floor; a support wall assembly comprising a first side wall support, a second side wall support, and a front wall support, each extending upwards from one or more perimeter portions of the floor, wherein the support wall assembly further defines a perimeter, and wherein the floor and the support wall assembly define an open trailer bed having an interior storage area; a first configurable panel member attached to the first side wall support; a second configurable panel member attached to the second side wall support; means for repositioning the first and second configurable panel members in which the means for repositioning at least partly secures the first and second configurable panel members to the first and second side wall supports, respectively, as well as facilitates the repositioning of the first and second configurable panel members between a first utility functioning position, a second utility functioning position, and a sleep functioning position; a wheel assembly coupled to the combination utility/camper trailer; and a hitch assembly coupled to the combination utility/camper trailer for removably coupling the combination utility/camper trailer to a motorized vehicle.

In a preferred embodiment, means for repositioning comprises a hinge coupling the first and second configurable panel members to the first and second side walls. Means for repositioning may also be comprised of a channel assembly or other configuration or system capable of functioning to allow the configurable panel members to be repositioned such that the combination utility/camper trailer is capable of converting between the first and second utility functioning configurations and the sleep functioning configuration.

The first and second side wall supports and the front wall support each extend up from respective perimeter side and front sections of the floor, wherein the second side wall support is offset from said first side wall support in an opposing and complimentary relationship, and wherein the front wall support is connected to the first and second side wall supports in a substantially perpendicular manner.

The support wall assembly further comprises a rear wall support extending up from a perpendicular rear section of the floor and connects to the first and second side wall supports in a substantially perpendicular manner. Like the side wall supports, the rear wall support is offset from the front wall support in an opposing and complimentary relationship.

As stated above, the combination utility/camper trailer of the present invention features at least three separate and independent functional positions or configurations. These configurations provide a unique aspect in that they are combined into a single utility/camper trailer, rather than requiring separate trailers to perform each function. Specifically, the combination utility/camper trailer of the present invention provides a first utility functioning position that is defined by the first and second configurable panel members being positioned in a substantially horizontal position extending inward from the first and second side wall supports, respectively, as well as being within the planar boundaries of the perimeter. The first and second configurable panel members are positioned in the first utility functioning position such that they are capable of providing a load bearing surface to the combination utility/camper trailer, such as for ATV's and other items or materials.

The second utility functioning position is defined by the first and second configurable panel members being positioned in a substantially vertical position such that they extend upward from the first and second side wall supports, respectively. The first and second configurable panel members are positioned in the second utility functioning position such that they are capable of providing an increased interior volume to said trailer bed which is useful when hauling large items or more cargo than is able to fit within the fixed trailer bed.

The sleep functioning position is defined by the first and second configurable panel members being positioned in a substantially horizontal position extending outward from the first and second side wall supports, respectively, and without said perimeter. In this position or configuration, the first configurable panel member defines a first sleeping area and the second configurable panel member defines a second sleeping area. As the configurable panel members extend in a substantially perpendicular manner from the side walls, it is necessary to support these properly so that they are capable of accepting and sustaining a load. Therefore, the present invention features means for retaining the configurable panel members, comprising preferably, a retaining assembly having a retaining rail and a plurality of extensions provided to offset the retaining rail from each of the configurable panel members. Means for retaining may also comprise one or more brace supports designed to fit between the panels and the trailer, thus functioning like a strut to stabilize and support the first and second configurable panel members in the sleep functioning position. In the sleep functioning position, the combination utility/camper trailer is capable of accepting a tent assembly.

It should be noted that the present invention contemplates other embodiments utilizing a plurality of configurable panel members on the utility/camper trailer, other than just first and second configurable panel members as described above. For example, on a four-place trailer first, second, third, and fourth configurable panel members may be utilized, with two of such members on each side of the trailer. In essence, the present invention is not limited to a first and second configurable panel member assembly, but may utilize several configurable panel members, as needed and desired. The several possible configurations and assemblies will be obvious and apparent to one ordinarily skilled in the art.

Furthermore, the present invention combination utility/camper trailer may be manufactured in various sizes and with various geometries. The preferred embodiment utility/camper trailer is as shown in the Figures and described herein. However, the present invention contemplates other designs, such as a smaller version of the preferred embodiment trailer specifically made to tow behind an ATV, such as a quad runner or four-wheeler. These will be obvious and apparent to one ordinarily skilled in the art.

Finally, the present invention features a truck bed frame removably fittable within the bed of a truck of any size, such as a full size truck or a smaller pickup truck. In this embodiment, the truck bed frame may comprise a base portion, side wall supports, front and rear wall supports, and two or more configurable panel members that function in a similar way as those described above. In this embodiment, the truck bed frame would function with the size and shape and wall supports existing on the truck to provide a similar function as the combination utility/camper trailer described in detail herein.

As stated, the present invention further features a tent assembly. The tent assembly preferably comprises a collapsible primary support structure, itself comprising a frame assembly and a plurality of stay extensions, which provide upper lateral support to a tent covering. In a preferred embodiment, the frame assembly comprises a series of biased components that are assisted in transitioning from a collapsed stored state or position to a fully assembled and set-up position. The biasing means used to bias the components of the frame assembly comprises one or more pneumatic or hydraulic lift assisting devices capable of supplying an appropriate amount of force to assist the user in setting up the tent assembly.

The frame assembly comprises a base portion having vertical load supports extending therefrom that are pivotally coupled to link arms, which are in turn pivotally coupled to a roof support and transition arms. The base portion is approximately the same size as the interior of the trailer bed of the utility/camper trailer. Moreover, the tent assembly comprises a tent covering as commonly known in the art to define an interior and volume of space and to provide a tent enclosure. The tent covering is supported by a plurality of stay extensions that removably couple to the frame assembly, wherein the plurality of stay extensions and the frame assembly comprise the primary support structure of the tent assembly.

The tent assembly is adapted to function with utility/camper trailer in its sleep functioning position. The configurable panel members provide sleeping areas capable of sleeping an individual thereon. In addition, the trailer bed of the trailer provides a seating and activity area, wherein a table or other items may be placed.

The tent assembly of the present invention is designed to be collapsible upon itself either in a fully assembled state with the tent covering and stay extensions in place or not. The entire tent assembly is capable of collapsing upon itself and being stored in a bag or sac-like container for protection and easy transport. To set up the tent assembly, all one has to do is set the tent assembly in the trailer bed of the utility/camper trailer, remove it from its protective bag, transition the configurable panel members to a sleep functioning position, and pull up on one of the components of the tent assembly to raise it from its stored, collapsed position.

Biasing means facilitate the lifting of the tent assembly. As such, the trailer of the present invention is capable of being converted from a utility-type trailer to a sleeping or camping trailer with little effort. Once in place, the tent assembly may be locked into place by actuating means for locking the tent assembly to prevent inadvertent or unintentional collapse of the tent assembly. The tent assembly covers the trailer bed as well as the first and second sleep positions provided by the utility/tow trailer to provide a tent enclosure and sleeping area.

To take down the tent assembly, the user simply deactuates means for locking and allows the tent, as fully assembled, to collapse upon itself, where it may be stored once again in its protective bag or sac-like covering. The tent assembly may then be removed from the trailer by simply removing the enclosed tent assembly.

It should be noted here that the present invention also contemplates a tent assembly that is utilized with the truck bed frame described above. The tent assembly for this particular embodiment would function similar to the frame assembly described above and in the preferred embodiment, but would sized and shaped to accommodate the design of the truck, rather than a trailer.

The present invention further features a table assembly that is removably and pivotally coupled to the frame assembly and that is capable of remaining attached while the tent assembly is collapsed. The table assembly comprises a unique design in that it may also be equipped with lift facilitating devices to assist the user in its takedown and set-up. The table assembly is also storable within the removable protective bag of the tent assembly.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings in which:

FIG. 14 illustrates a detailed view of the upper portion of the frame assembly of the tent assembly and the relation of component to one another according to one embodiment of the present invention;

FIG. 15-B illustrates means for locking tent assembly in a locked position, and namely the quick release mechanism slidably attached to the frame assembly as tent assembly and the quick release mechanism are in a locked position;

DETAILED DESCRIPTION OF THE PREFERRED EMBODIMENTS

It will be readily understood that the components of the present invention, as generally described and illustrated in the figures herein, could be arranged and designed in a wide variety of different configurations. Thus, the following more detailed description of the embodiments of the system and method of the present invention, and represented in FIGS. 1 through 21, is not intended to limit the scope of the invention, as claimed, but is merely representative of the presently preferred embodiments of the invention.

The presently preferred embodiments of the invention will be best understood by reference to the drawings wherein like parts are designated by like numerals throughout.

The present invention describes a method and system for combining the beneficial functions of multiple tow trailer types, such as utility and camper type trailers, into a single, integrated utility/camper trailer by providing a unique utility/camper trailer that is adaptable to receive a unique tent assembly. Both the utility/camper trailer and the tent assembly comprise a unique combination and concept. Specifically, the present invention combines the benefits and advantages of stand alone utility-type trailers along with camping trailers into a single, integrated utility/camper trailer, while providing a unique tent assembly, and preferably a removable tent assembly, for use or integrated with the utility/camper trailer. In addition, the unique concept of the present invention tent assembly is contemplated to comprise several various configurations and designs, thus allowing it to be adaptable to fit within and function with other utility trailers and/or vehicles. The specifics of both the utility/camper trailer and the tent assembly are each discussed in turn below.

Utility/Camper Trailer Assembly

Figure 1:
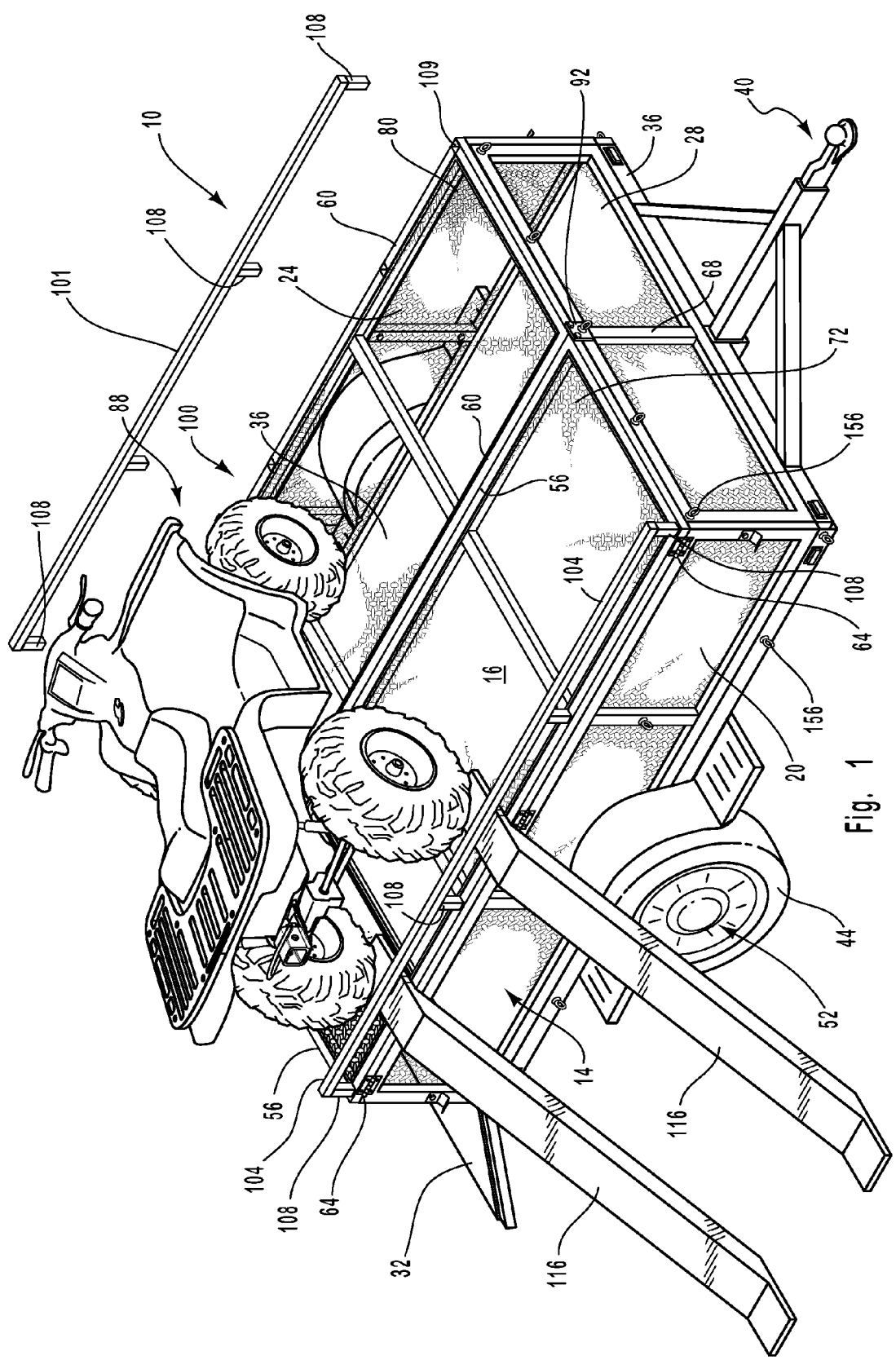
FIG. 1 illustrates a perspective view of the combination utility/camper trailer in the first utility functioning configuration.
Figure 2:
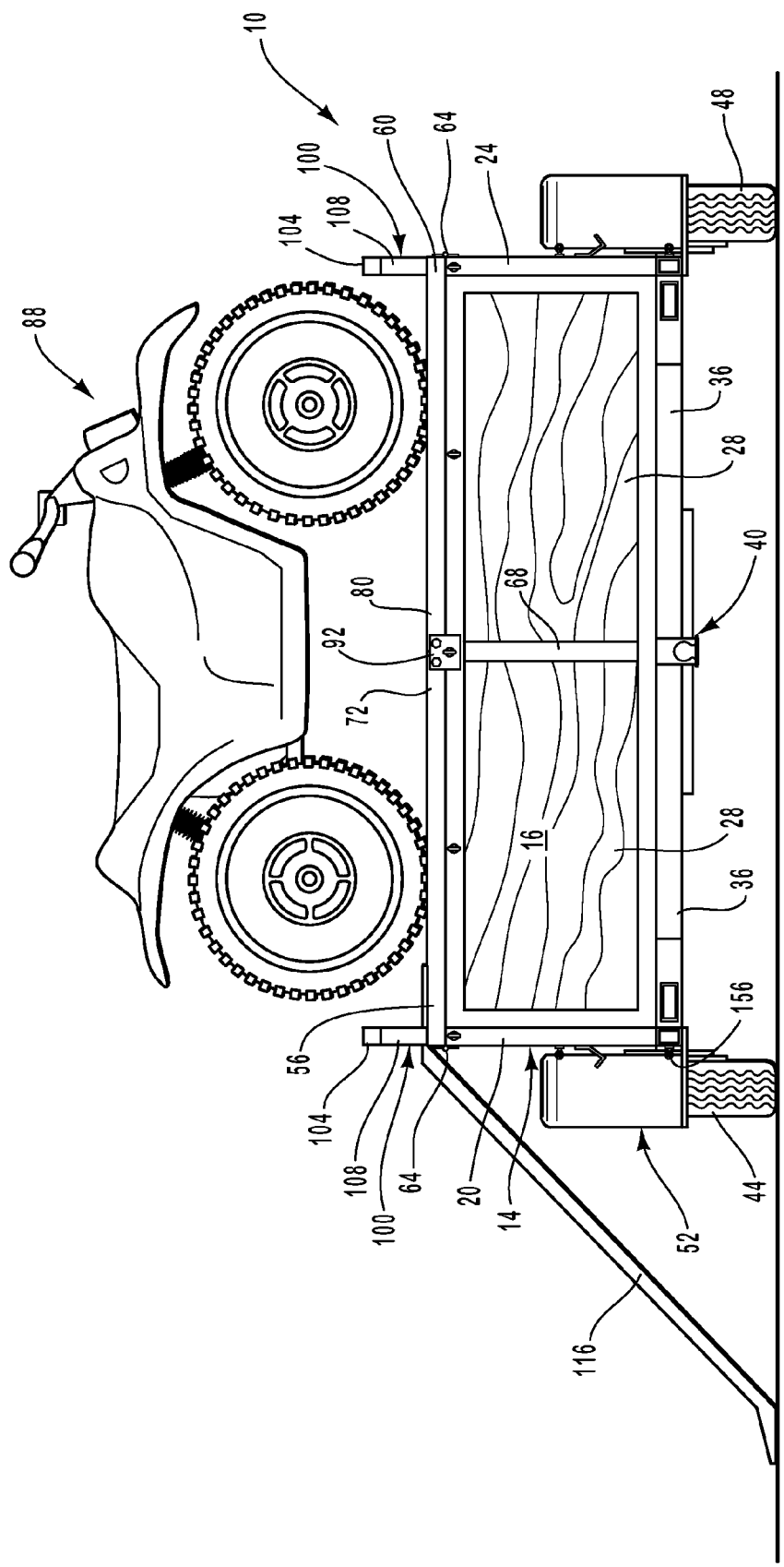
FIG. 2 illustrates a front view of the combination utility/camper trailer in the first utility functioning configuration.

Referring to FIGS. 1 and 2, illustrated is the utility/camper trailer 10 in a first utility functioning configuration. Utility/camper trailer 10 comprises a first side wall support 20 offset from a second side wall support 24 in an opposing and complimentary relationship to one another so as to comprise the side walls of trailer 10. Trailer 10 further comprises front wall support 28 and an optional rear wall support 32 (not shown), also offset in an opposing and complimentary relationship from one another, to form and define a perimeter, along with their relationship to floor 36, to comprise trailer bed 14, which is open along its top, and which is capable of accepting a load into its interior 16. First and second side wall supports 20 and 24 and front and rear wall supports 28 and 32 are preferably rigidly coupled to floor 36 so as to provide lateral support for trailer 10, and specifically trailer bed 14, which is capable of accepting and containing a load therein. Moreover, first and second side walls 20 and 24 and front and rear wall supports 28 and 32, respectively, extend upwards from a perimeter portion of floor 36 in a substantially perpendicular manner.

As stated, trailer bed 14 comprises an interior portion or storage area 16 defined by the perimeter formed by said first and second side wall supports 20 and 24, and front and rear wall supports 28 and 32. The configuration or setup of trailer 10, and specifically trailer bed 14, preferably comprises the open box-type setup described above. However, one ordinarily skilled in the art may recognize other configurations and setups on which the concepts and designs, as described and discussed herein, may be used.

In the first utility functioning configuration as depicted in FIGS. 1 and 2, utility/camper trailer 10 further comprises first configurable panel member 56 and second configurable panel member 60, each attached or coupled to first and second side wall supports 20 and 24, respectively, and positioned so as to provide a first and second utility surface 72 and 80, respectively. Specifically, first and second configurable panel members 56 and 60 extend inward from a top portion of first and second side wall supports 20 and 24 in a substantially perpendicular manner. First and second configurable panel members 56 and 60, when in this first utility functioning position, come to rest upon and are each supported by side wall supports 20 and 24, respectively, as well as front wall support 28 and optional rear wall support 32. The top perimeter portions or surfaces of side wall supports 20 and 24 and the top perimeter portions of front wall and optional rear wall supports 28 and 32 serve to receive first and second configurable panel member 56 and 60 and are of sufficient strength so as to be able to provide the required support for first and second configurable panel members 56 and 60 as these are designed to be load bearing members. Side wall supports 20 and 24, along with front wall support 28 provide the primary and first means of support for first and second configurable panel members 56 and 60.

As additional support may be required, the present invention comprises optional central support member 68, which may be centered within trailer bed 14 and which may be provided to add additional support to first and second configurable panel members 56 and 60 by supporting panel members 56 and 60 along their further most extended edge. These are explained in greater detail in FIG. 7.

First and second configurable panel members 56 and 60 may be secured in place by securing assembly 92, which may comprise a latch and lock system, a bolt receiving system, a key lock system, or any other possible known type of means capable of securing panel members 56 and 60 in the position shown.

First and second configurable panel members 56 and 60 are preferably constructed of high yield steel, or a combination of various wood/steel elements. While the particular construction is not to be limited, it should be noted that the particular construction and material makeup of the panel members 56 and 60 must possess sufficient strength characteristics to allow trailer 10 to be used for its intended purposes.

FIGS. 1–6 further illustrate means for retaining first and second configurable panel members 56 and 60. Several possible assemblies or devices exist that may serve to perform the intended function of this means, but in the embodiment shown in FIGS. 1 and 2, means for retaining the panel members 56 and 60 comprises a retaining system 100 comprising a retaining rail 104 and a series of extensions 108 supporting retaining rail 104 at an offset distance from the upper surface of panel members 56 and 60 of trailer 10.

Retaining system 100 provides several functions, but are specifically included for providing support to panel members 56 and 60 in their sleep functioning position as described below. Retaining system 100 may also provide lateral support to a load being carried atop the panel members 56 and 60 when in their first utility functioning position as shown in FIG. 1.

In addition, removably coupled wall mounts 101 may be coupled to said utility/camper trailer when in said first utility functioning position to provide lateral support for any loads being carried by said utility/camper trailer. Wall mounts 101 may be selectively and removably coupleable as shown in FIG. 1A.

FIGS. 1 and 2 further show means for repositioning first and second configurable panel members 56 and 60 (shown as means for repositioning 64), which is capable of providing at least partial support to the first and second configurable panel members 56 and 60, and which is capable of facilitating the repositioning of the panel members 56 and 60 to a different position. It is this repositioning ability of panel members 56 and 60 that allows trailer 10 to comprise multiple functioning configurations in a single, concept integrated trailer, such as one or more utility functioning configurations or a sleep functioning configuration. As shown, panel members 56 and 60 utilize a hinge system coupling first configurable panel member 56 to first side wall support 20 and second configurable panel member 60 to second side wall support 24. The hinge system allows panel members 56 and 60 to be repositioned between a first utility functioning position, a second utility functioning position, and a sleep functioning position simply by pivoting panel members 56 and 60 about their axis of rotation located at the center of the hinge system. Means for repositioning 64 further provides support to panel members 56 and 60 to ensure proper position and alignment during repositioning as well as each intended resting position.

The first utility functioning configuration of FIGS. 1 and 2 provides a sturdy and strong utility surface (72 and 80) that may accept and support various types of loads and cargo. Illustrated is an ATV 88 that is placed upon utility surfaces 72 and 80 with or without using a ramp 116. Retaining rail 104 may also be used to provide additional lateral support for any cargo stored atop of panel members 56 and 60. Also shown is ramp 116, which may be removable coupled to trailer 10 as commonly known in the art.

In addition to providing a surface for storing and supporting a load, when panel members 56 and 60 are in this first utility functioning configuration, trailer 10 provides an enclosed storage area 16 where various cargo and other materials may be stored for transport.

Figure 3:
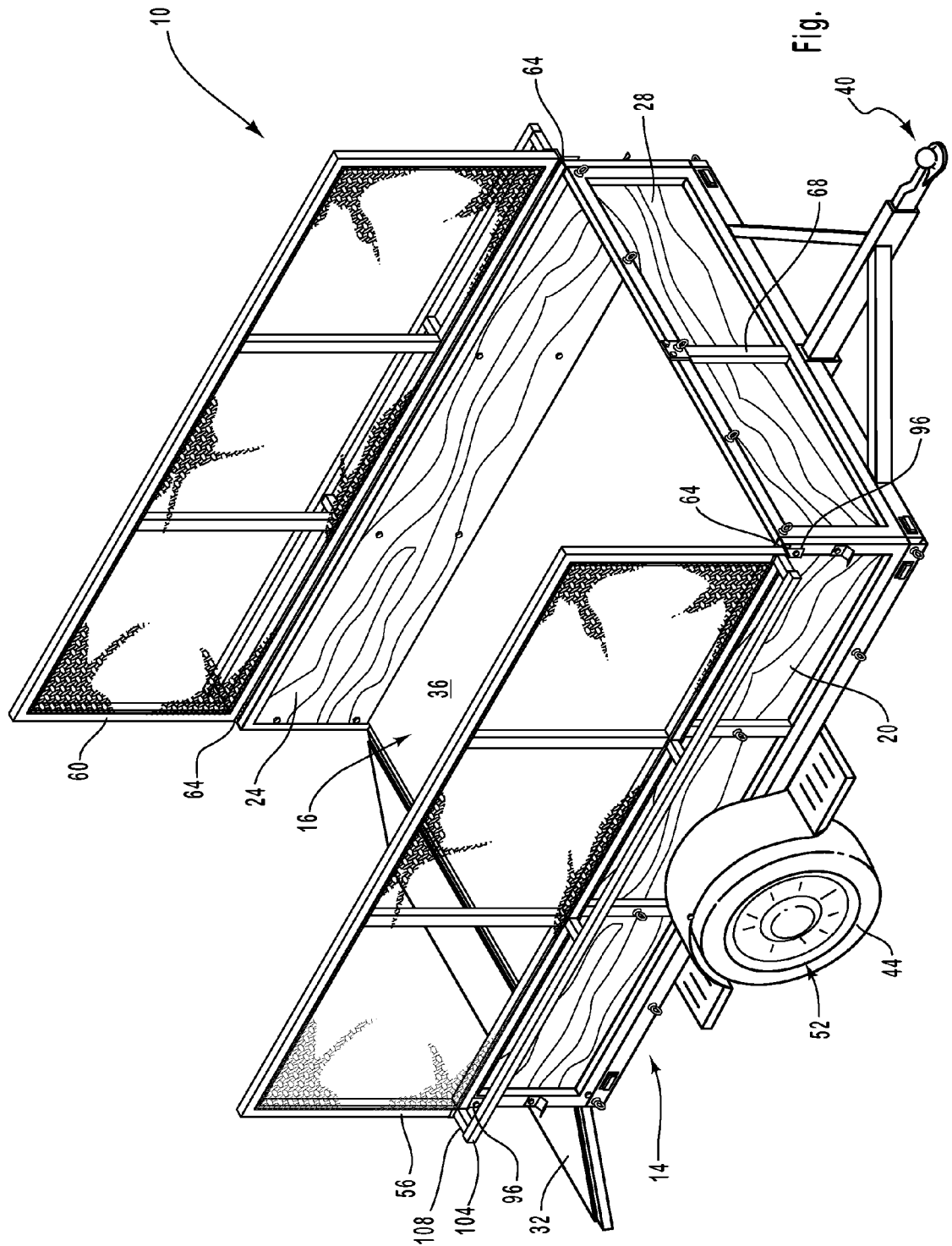
FIG. 3 illustrates a perspective view of the combination utility/camper trailer in the second utility functioning configuration.
Figure 4:
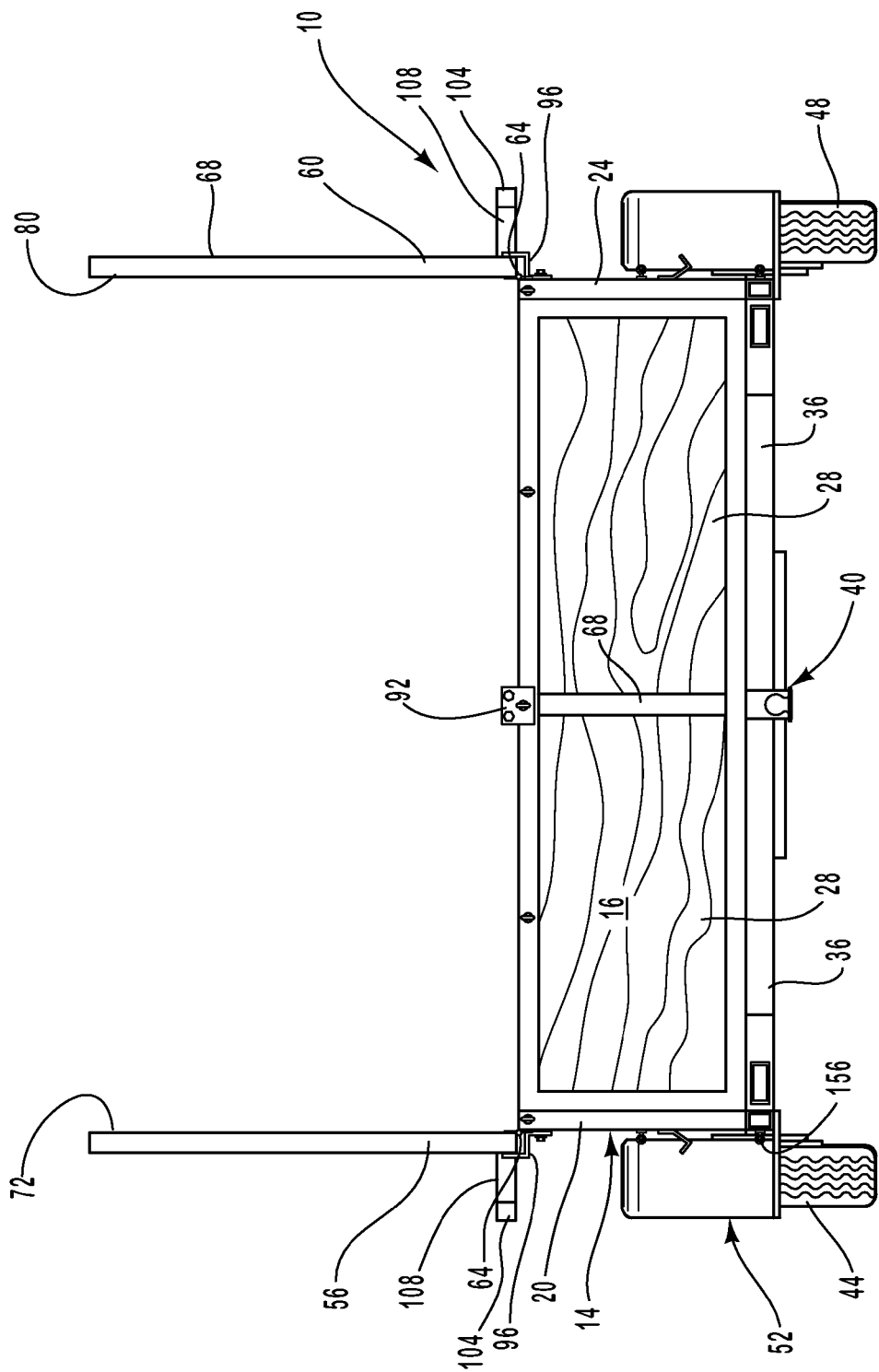
FIG. 4 illustrates a front view of the combination utility/camper trailer in the second utility functioning configuration.

Referring now to FIGS. 3 and 4, illustrated is second utility functioning position or configuration. In this configuration, utility/camper trailer 10 comprises the same features and elements as that described in the embodiment shown in FIGS. 1 and 2 regarding the trailer 10 and trailer bed 14. Moreover, in the second utility functioning configuration, trailer 10 further comprises first configurable panel member 56 and second configurable panel member 60, each attached or coupled to first and second side wall supports 20 and 24, respectively, and as described above. However, rather than extending substantially perpendicular and inward to form a utility surface, panel members 50 and 60 are each positioned so as to provide a substantially vertical extension to first and second side wall supports 20 and 24. Specifically, first and second configurable panel members 56 and 60 extend from a top portion of first and second side wall supports 20 and 24 in a substantially vertical manner and are supported in place by securing mechanism 96. In this configuration, trailer 10 comprises an increased interior storage area 16. Repositioning panel members 56 and 60 to provide an increased interior 16 provides many significant advantages, one of which is to significantly increase in the size and/or amount of cargo that may be placed within interior 16. In this position, panel members 56 and 60 serve to provide additional lateral load support to trailer 10, and particularly trailer bed 14. In addition, securing means 97 is capable of securing panel members in place so as to allow relatively high moments or forces to be applied directly to extended panel members 56 and 60. Therefore, any loads that are carried in interior 16 that exert a force or moment upon panel members 56 and 60 in this second utility functioning configuration will be properly supported.

While prior art trailers may comprise extended side wall supports to increase their respective interior storage areas, the present invention trailer 10 is capable of doing so by repositioning panel members 56 and 60 from another configurational position or setup, such as repositioning panel members 56 and 60 from a first utility functioning configuration as described above. Such is advantageous because a user may desire trailer 10 to function as a utility trailer having utility surfaces as shown in FIGS. 1 and 2, or a user may quickly desire a trailer having a larger and more voluminous cargo interior. Using the convertible or repositioning concept as taught and described herein, the user may quickly interchange trailer 10 to accommodate both desires in an almost effortless manner. As will be shown below, trailer 10 may convert back and forth between a first utility functioning configuration, a second utility functioning configuration, and a sleep functioning configuration just by repositioning or configuring first and second configurable panel members 56 and 60 in their respective positions for providing such.

Figure 5:
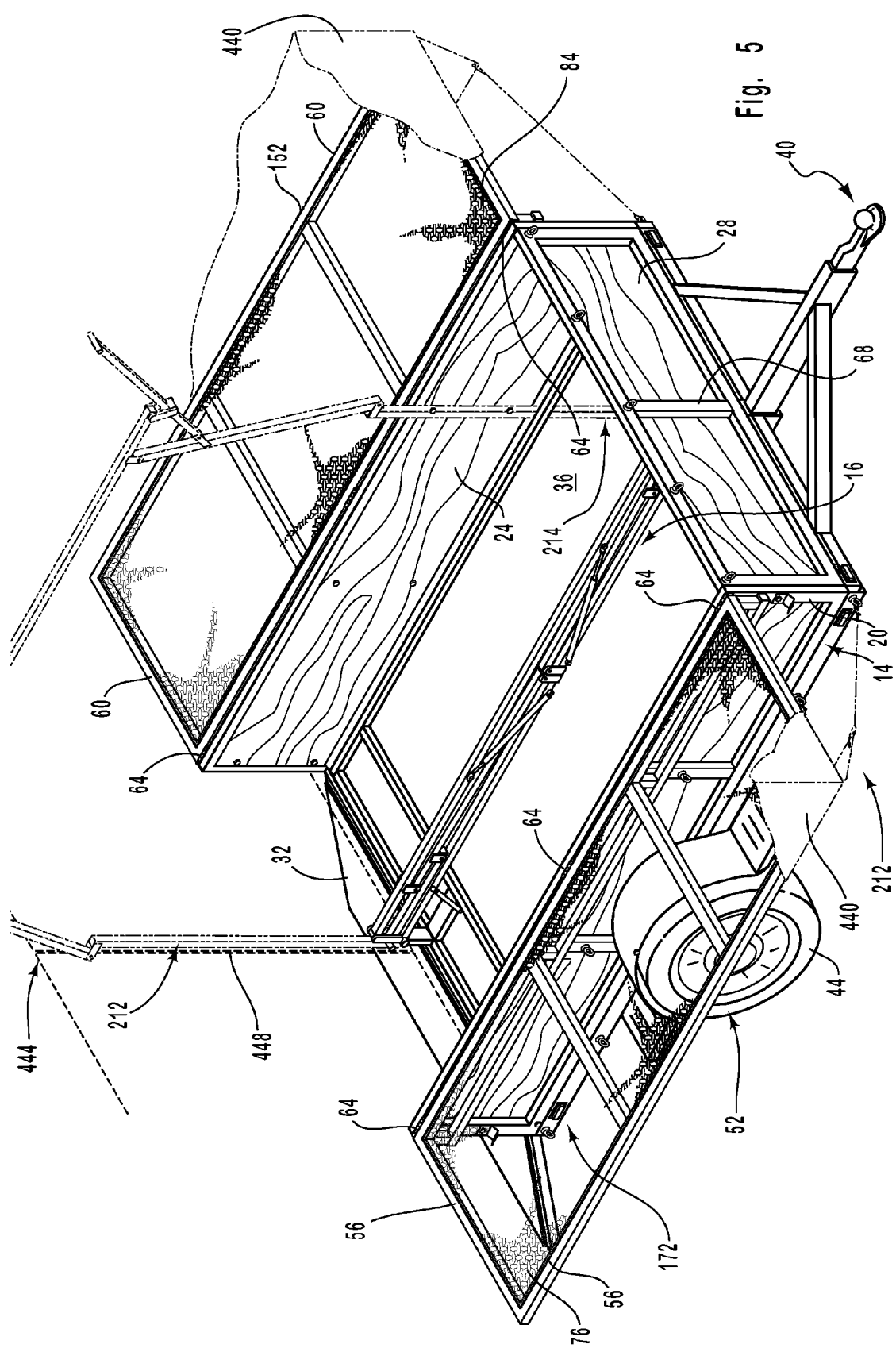
FIG. 5 illustrates a perspective view of the combination utility/camper trailer in the sleep functioning configuration, as well as the associated tent assembly according to one embodiment of the present invention.
Figure 6:
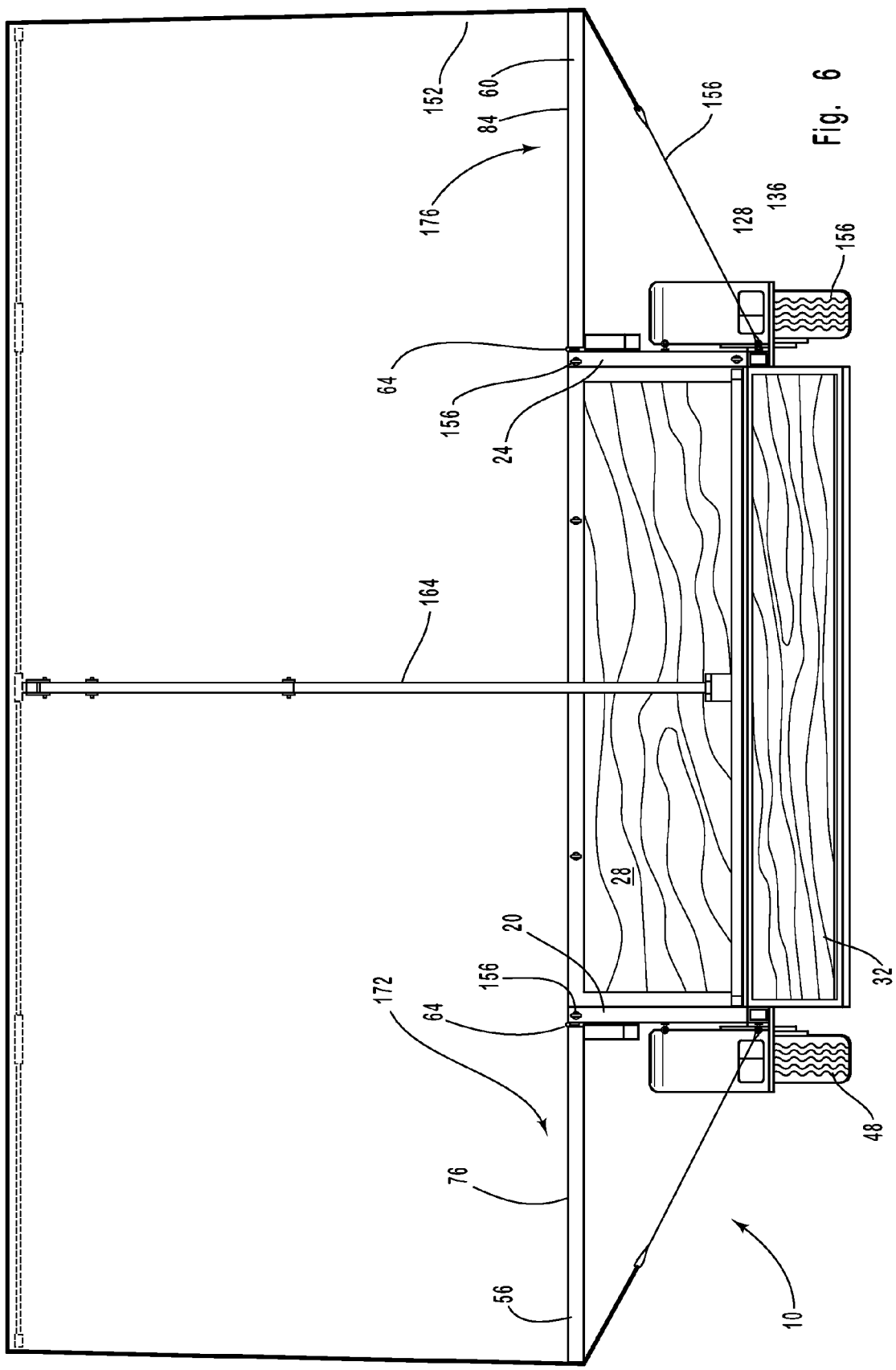
FIG. 6 illustrates a rear view of the combination utility/camper trailer in the sleep functioning configuration, as well as the associated tent assembly according to one embodiment of the present invention.

Referring now to FIGS. 5 and 6, illustrated is sleep functioning position or configuration. In this configuration, utility/camper trailer 10 comprises the same features and elements as that described in the embodiment shown in FIGS. 1 and 2 regarding the trailer 10 and trailer bed 14. Moreover, in this sleep functioning configuration, trailer 10 further comprises first configurable panel member 56 and second configurable panel member 60, each attached or coupled to first and second side wall supports 20 and 24, respectively, and as described above. However, rather than extending substantially perpendicular and inward to form a utility surface, or rather than extending in a substantially vertical manner to form an increased interior storage area, panel members 50 and 60 are each positioned in a substantially horizontal position, extending outward from a top portion of first and second side wall supports 20 and 24, respectively, such that panel members 56 and 60 are without the perimeter. In this sleep functioning position or configuration, first configurable panel member 56 defines a first sleeping area 172 and second configurable panel member 60 defines a second sleeping area 176.

FIGS. 5 and 6 also show tent assembly 210. The details of the components of tent assembly 210 are discussed below, however for purposes of the discussion with reference to FIGS. 5 and 6, tent assembly 210 is designed to fit within interior portion 16 of trailer bed 14 and to spring into place upon repositioning first and second configurable panel members 56 and 60 to the sleep functioning position. Tent assembly 210 comprises frame assembly 214 that preferably comprises a plurality of biased or loaded members (not shown, but discussed below) that are capable of springing into a "set-up" position, which defines the boundaries of tent assembly 210. Moreover, tent assembly 210 further comprises tent covering 440 attached to frame assembly 214. Frame assembly 214 and tent covering 440, while springing into their fully set-up position when trailer 10 is converted to its sleep functioning position, are storable within interior 16 during transport of trailer 10 and when trailer 10 is in its first utility functioning position.

Tent covering 440 is designed to enclose first and second sleeping areas 172 and 176 as well as interior 16 of trailer 10. In this manner, covering 440 provides a totally enclosed sleeping area, wherein a user may enter and receive protection from the outside environment. Covering 440 is preferably designed to be removably coupled to frame assembly 214 and various parts of trailer 10. For instance, covering 440 may attach to trailer 10 using a plurality of fastening means, such as snaps, Velcro®, or any other type of fastening means available and known in the art. Covering 440 may further comprise a door assembly 444 having a door opening 446 closeable by zipper 448. The user may enter opening 446 and the enclosed sleeping area using steps 168 that may be removably coupled to trailer 10 and stored in interior 16 when not in use. Tent assembly 210 is designed to be easily set up and adapted to fit utility/camper trailer 10. When tent assembly 210 is to be removed, it is simply taken down, released from trailer 10 and stored in interior storage space 16 and trailer 10, wherein panel members 56 and 60, are repositioned to a first or second utility functioning configuration (shown as hidden lines in FIG. 6) by relocating panel members 56 and 60 via means for repositioning 64.

First and second sleeping areas 172 and 176 further comprise first and second sleeping surfaces 76 and 84, respectively. First and second sleeping surfaces 76 and 84 may comprise some type of padding or other material that softens the surface and makes panel members 56 and 60 more suitable for hosting an individual for extended periods of time.

To convert trailer 10 from one of its utility functioning configurations to the sleep functioning configuration as shown in FIGS. 5 and 6, one simply repositions first and second configurable panel members 56 and 60 by actuating means for repositioning 64. In the preferred embodiment, means for repositioning 64 comprises a hinge assembly as described above allowing the user to simply pivot panel members 56 and 60 about the hinge axis (as illustrated by the arrows) until panel members 56 and 60 are brought into the desired position as shown.

Retaining assembly 100 is used to provide the necessary support to panel members 56 and 60 in this sleep functioning position. Specifically, as panel members 56 and 60 are rotated or repositioned into the sleep functioning position, retaining assembly 100, and particularly retaining rail 104 and extensions 108, are brought into contact with the outer surface of first and second side wall supports 20 and 24 (or one or more braces within wall supports 20 an 24), respectively. Using extensions 108, retaining rail 104 is offset at a calculated distance from panel members 56 and 60, such that retaining system 100 functions as a moment arm capable of supporting panel members 56 and 60 in their extended horizontal position. Stated differently, retaining system 100 resists the tendency of panel members 56 and 60 to rotate further about the axis of rotation located along the central axis of the hinge portion of means for repositioning 64, especially as a load is applied to panel members 56 and 60, such as a person, because of the inherent strength of the materials used in retaining system 100 and the offset distance of retaining rail 104 from panel members 56 and 60. As such, the contact and relationship between retaining system 100 and side wall supports 20 and 24 provides adequate support and resists any rotational forces applied to retaining system 100.

Figure 7:
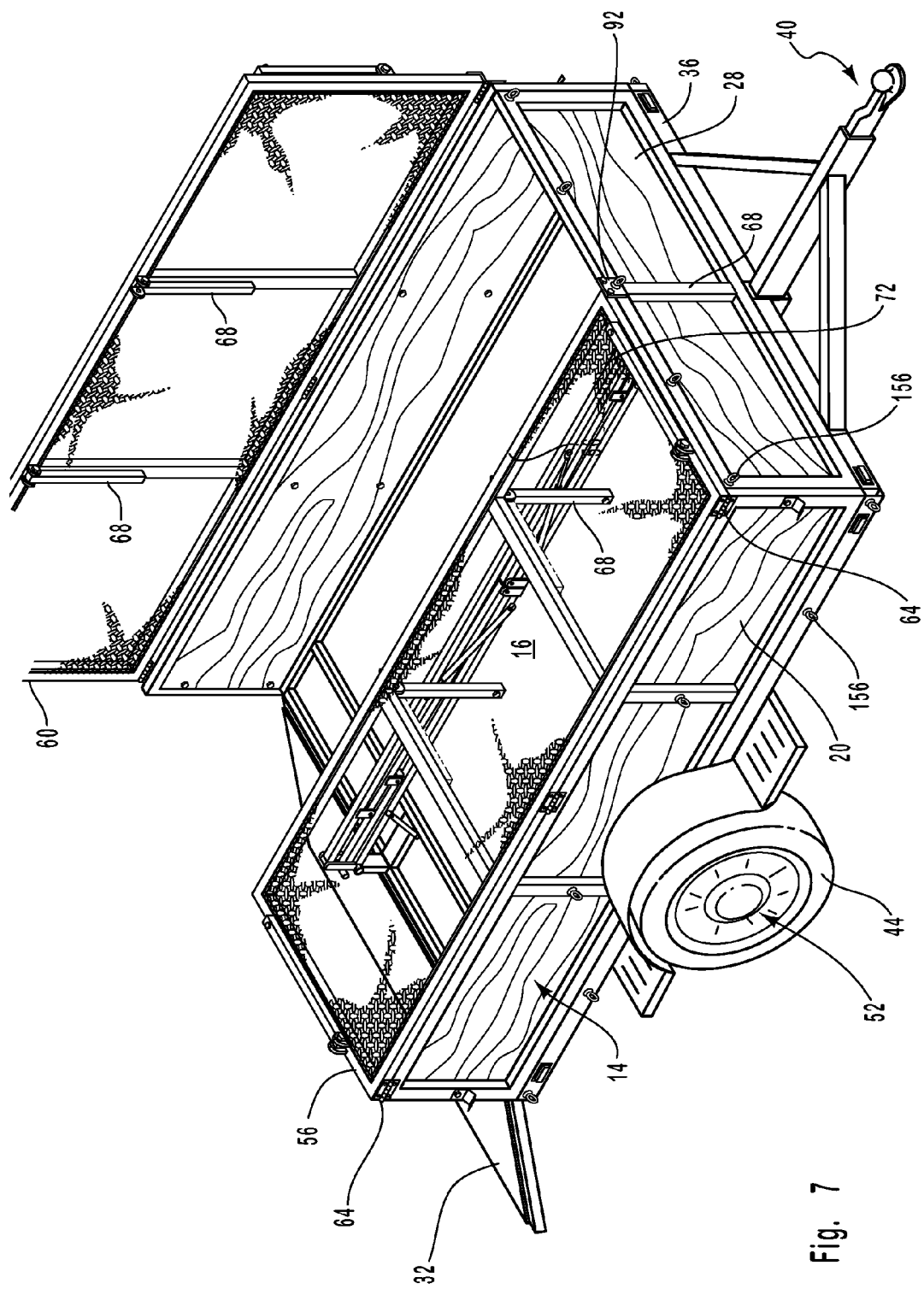
FIG. 7 illustrates a perspective view of an alternative embodiment of the combination utility/camper trailer and means for supporting the configurable panel members in the sleep functioning configuration, namely a series of brace supports.

With reference to FIG. 7, as shown is an alternative embodiment of means for retaining first and second configurable panel members 56 and 60 in a sleep functioning position. Specifically, means for retaining panel members 56 and 60 comprises a series of brace supports 120. again, in the sleep functioning position, panel members 56 and 60 extend in a substantially perpendicular manner from side wall supports 20 and 24, and, as it is intended that configurable panel members 56 and 60 are load bearing members in this position, brace supports 120 are provided. Brace supports 120 are designed to extend between each of panel members 56 and 60 and trailer 10 as shown. As such, panel members 56 and 60 are capable of properly accepting and supporting a load. In this particular embodiment, the load intended to be accepted and supported by panel members 56 and 60 are persons desiring to sleep upon first and second sleeping areas 172 and 176. As such, brace supports 120 are designed to fit between each panel member 56 and 60 and trailer 10, thus functioning like a strut to stabilize and support first and second configurable panel members 56 and 60 in the sleep functioning position. Brace supports 120 comprise a first end 124 that is removably coupled to a configurable panel member attachment 132 located on the underneath or outer exposed surface of panel members 56 and 60. Brace supports 120 further comprise a second end 128 that is removably coupled to a trailer attachment 136 located on the outside of trailer 10, and preferably on the outside of the frame portion of trailer 10 or side wall supports 20 and 24.

Figure 8:
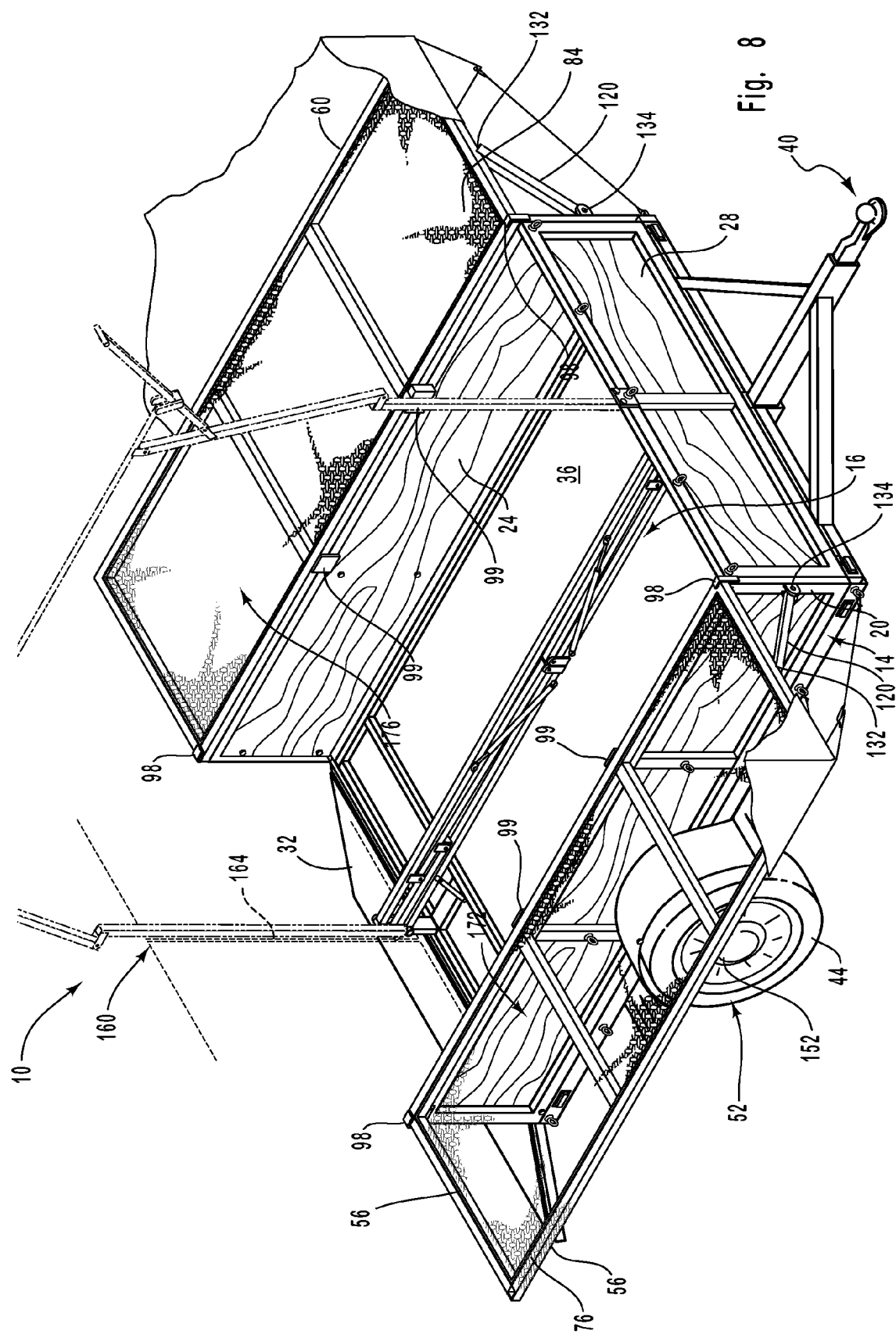
FIG. 8 illustrates an alternative embodiment depicting repositioning means comprising a channel assembly, wherein the first and second configurable panel members are able to slide bi-directionally within the channel to convert the combination utility/camper trailer between the first utility functioning configuration and the sleep functioning configuration.
Figure 9:
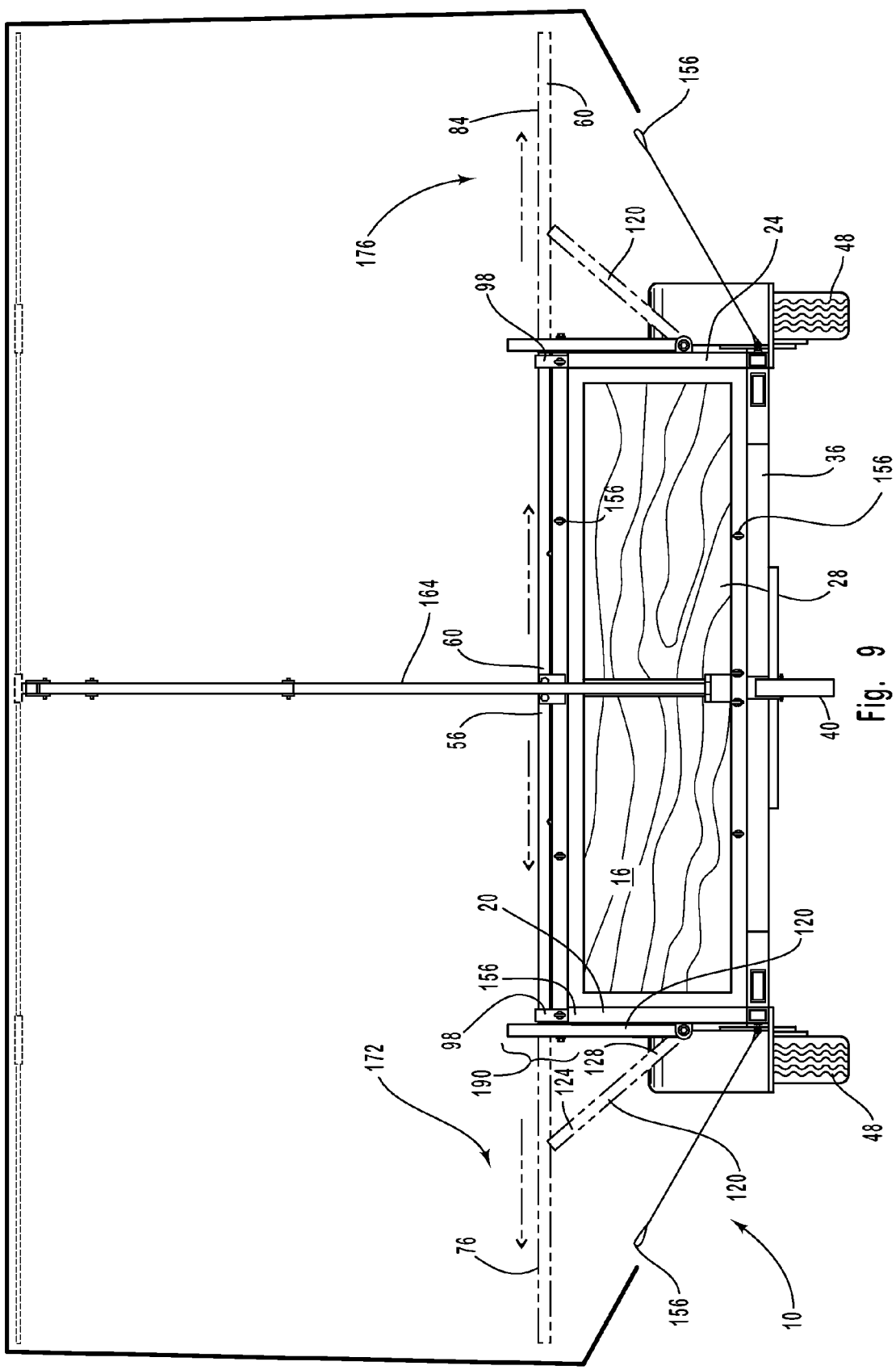
FIG. 9 illustrates a front view of the embodiment shown in FIG. 8.

In another alternate embodiment shown in FIGS. 8 and 9, repositioning means 64 comprises a channel or groove assembly 190, wherein a channel 98 extends from and along an upper portion of each of first and second side wall supports 20 and 24. Channel 98 is capable of coupling first and second configurable panel members 56 and 60 such that the configurable panel members are allowed to slide in a bi-directional manner between the first utility functioning position and the sleep functioning position as described above. Channel assembly 190 further comprises a securing assembly 99 for securing first and second configurable panel members 56 and 60 in their respective positions. Moreover, channel assembly 190 may be adapted to allow first and second configurable panel members 56 and 60 to also be repositioned so that trailer 10 is capable of the second utility functioning configuration as described above.

In an alternative embodiment, the present invention contemplates utilizing a plurality of configurable panel members on the utility/camper trailer, other than just first and second configurable panel members as described in detail above. For example, on a four-place trailer first, second, third, and fourth configurable panel members may be utilized, with two of such members on each side of the trailer. In this embodiment, some configurable panel members may be placed in different positions than others so that, if desired, the user could, for example, use the trailer for utility purposes as well as with the tent assembly. In essence, the present invention is not limited to a first and second configurable panel member assembly, but may utilize several configurable panel members, as needed and desired. The several possible configurations and assemblies will be obvious and apparent to those of ordinary skill in the art.

Furthermore, the present invention combination utility/camper trailer may be manufactured in various sizes and with various geometries. The preferred embodiment utility/camper trailer is as shown in the Figures and described herein. However, the present invention contemplates other designs, such as a smaller version of the preferred embodiment trailer specifically made to tow behind an ATV, such as a quad runner or four-wheeler. These also will be obvious and apparent to one ordinarily skilled in the art.

Finally, the present invention features a truck bed frame assembly removably fittable within the bed of a truck of any size, such as a full size truck or a smaller pickup truck. The truck bed frame assembly is designed to function in a similar manner as the utility/camper trailer in that it comprises a base portion, side wall supports, front and rear wall supports, and two or more configurable panel members that also function in a similar manner as those described above. In this particular embodiment, the truck bed frame assembly is placed in the interior bed of a truck. The frame assembly may be manufactured to fit between the wheel wells of the truck bed or over the wheel wells, wherein the frame assembly would be t-shaped. In any event, the truck bed frame assembly may be positioned within the bed of the truck and the configurable panel members oriented in either one of the positions described above. Specifically, the configurable panel members of the truck bed frame may be positioned in a first or second utility functioning position, or in a sleep functioning position to support the tent assembly as described and shown herein.

Tent Assembly for Utility/Utility/Camper Trailer

Although the present invention tent assembly may comprise several designs, configurations, systems, and assemblies as known in the art and as described above, the following Figures illustrate and describe one exemplary embodiment designed to set forth many of the objects and advantages of the present invention.

Referring back to FIGS. 5, 6, 8, and 9, as stated, in the sleep functioning configuration, trailer 10 may be adapted to receive tent assembly comprised of frame assembly 214 and cover 440. In this configuration, trailer 10 serves to function in a similar manner as a camper or tent trailer. However, rather than requiring two or more trailers, such as one to haul various cargo and other gear or material and another to provide a sleeping area, the present invention utility/camper trailer serves both intended functions. For example, one may pack gear and other materials into interior storage space 16 and then reposition first and second configurable panel members in the first functioning utility configuration as described above, whereon various other loads may be placed, such as an ATV, etc. In addition, one may store tent assembly 210 within interior storage area 16 for later adaptation to trailer 10 when it is repositioned in the sleep functioning configuration.

In the sleep functioning configuration of FIGS. 5–9, trailer 10 may be adapted to comprise tent assembly 210. Tent assembly 210 is not meant to be limited and may comprise any type of tent capable of being removably coupled to trailer 10 and first and second configurable panel members 56 and 60. However, the present invention contemplates and comprises a unique tent assembly capable of fitting within and functioning with trailer 10.

Figure 10:
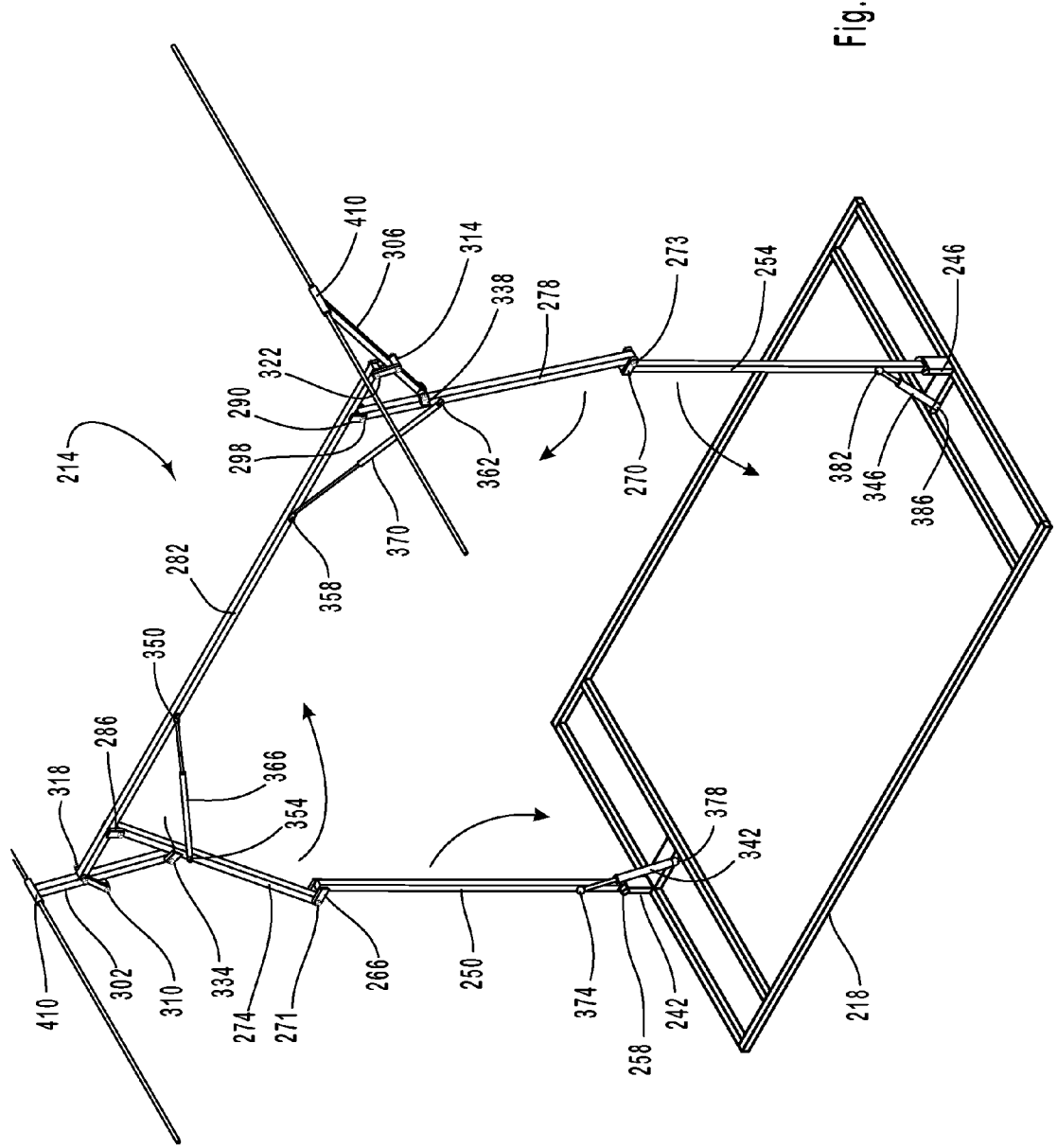
FIG. 10 illustrates a front view of the frame assembly of the tent assembly according to one embodiment.
Figure 11:
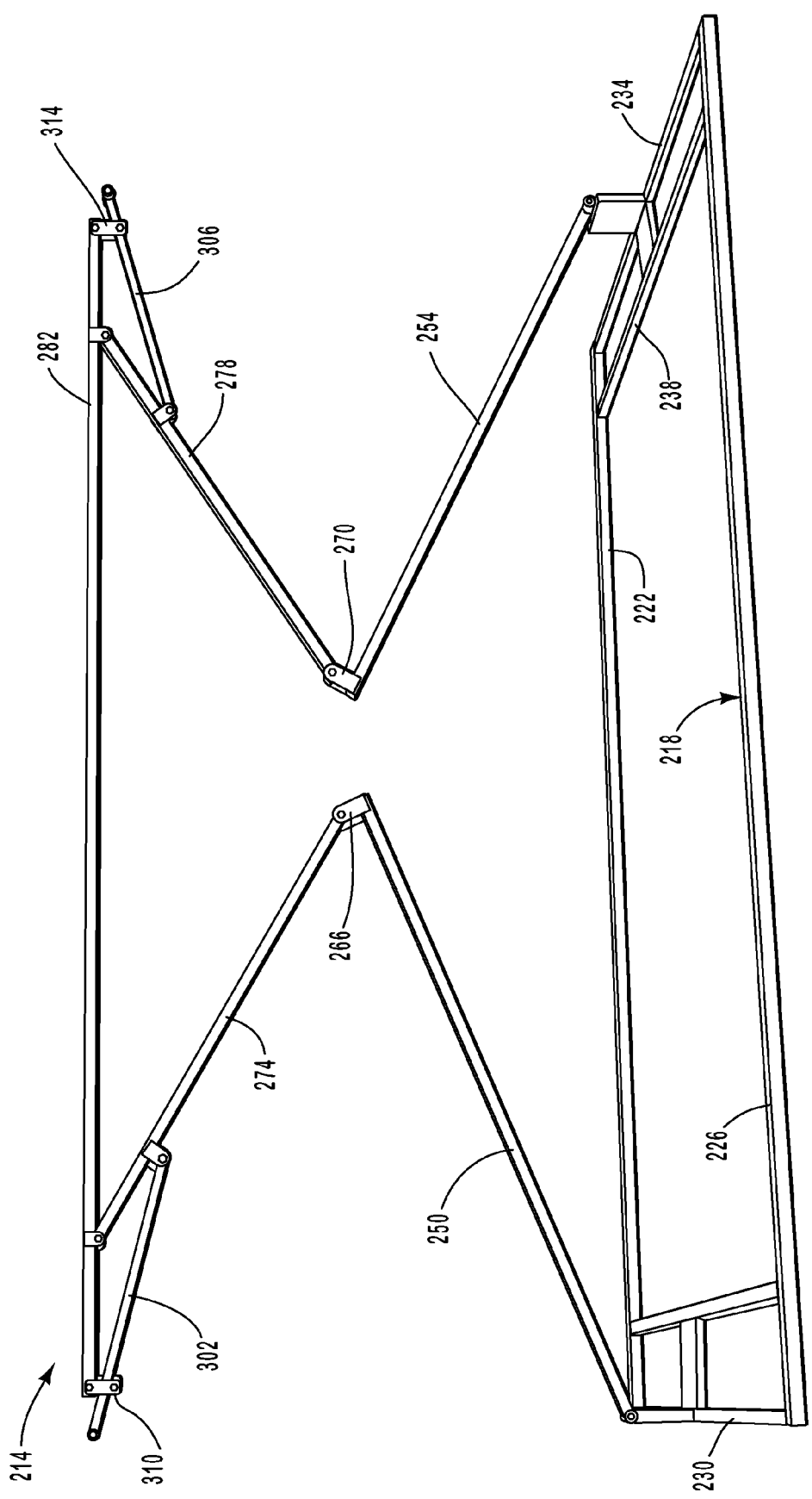
FIG. 11 illustrates the frame assembly of the tent assembly in a partially collapsed position according to one embodiment.
Figure 12:
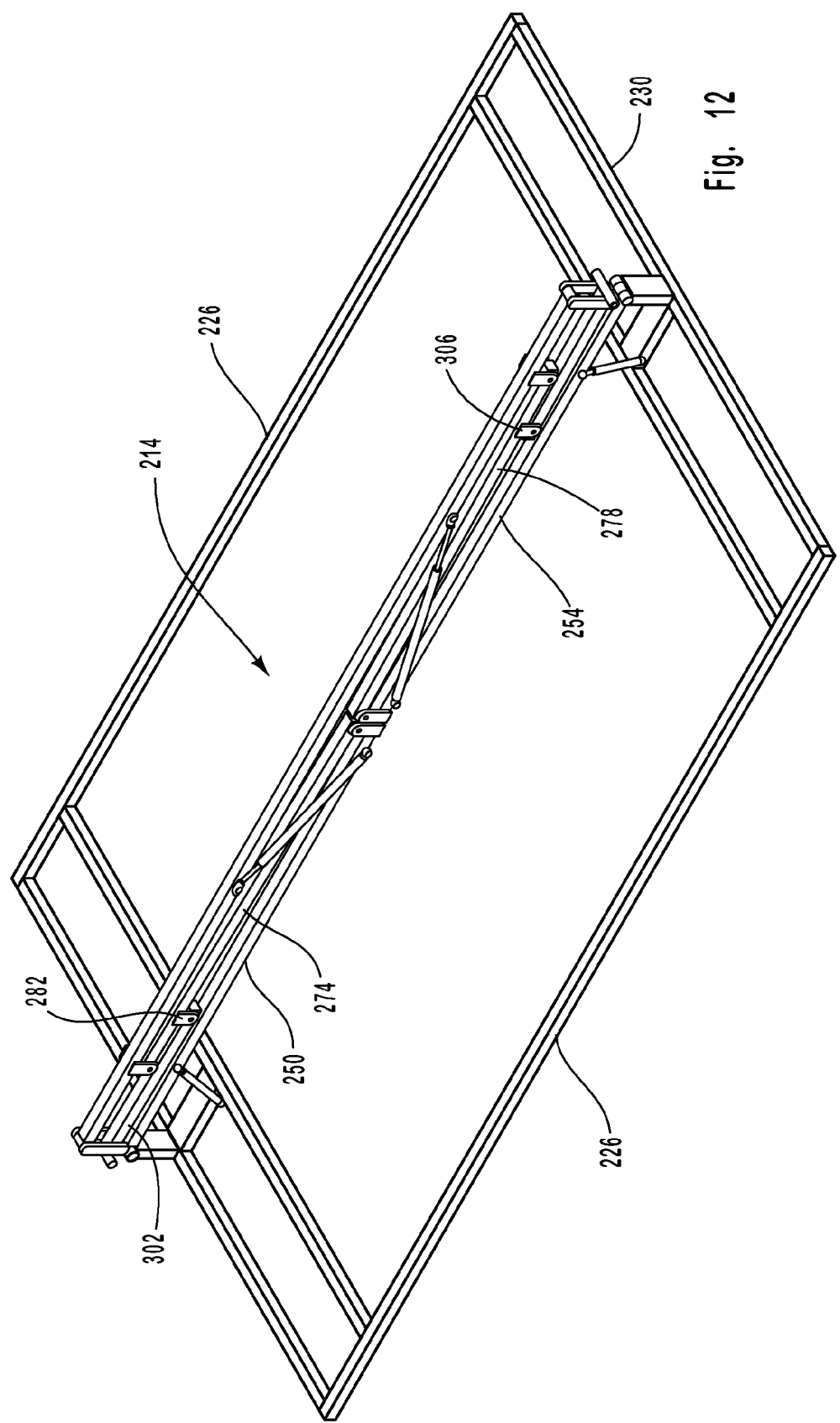
FIG. 12 illustrates the frame assembly of the tent assembly in a collapsed, storable position.

With reference to FIGS. 10–12, the tent assembly of the present invention comprises a primary support structure 212 that is collapsible to provide easy storage and transport of the tent assembly. Primary support structure 212 itself comprises frame assembly 214 and a plurality of stay extensions (not shown). Frame assembly 214 comprises a base portion 218 having first longitudinal support member 222 and second longitudinal support member 226 joined with first lateral support member 230 and second lateral support member 234 to form a planer support or base portion 218 designed to serve as the primary load-bearing portion of frame assembly 214. Frame assembly 214, and particularly base portion 218, is designed to withstand horizontal and vertical loads as well as torsional loads placed upon tent assembly 210. In the embodiment shown, base portion 218 comprises a substantially rectangular geometric shape that is capable of fitting within the interior of the trailer bed of the utility tow trailer as described above. Preferably, base portion 218 is sized or dimensioned to slightly less than those of the interior trailer bed portion of the utility tow trailer so as to maximize the interior space of tent assembly 210 in its fully assembled and set-up position within the utility tow trailer. Base member 218 further comprises lateral mount support 238 that spans between first and second longitudinal support members 222 and 226 and is designed to accept various accessories to be used within tent assembly 210. In one embodiment, lateral mount support 238 is used to accept a table assembly, which will be described further below.

Frame assembly 214 further comprises first base mount 242 and second base mount 246 coupled to the center portions of first lateral support member 230 and second lateral support member 234, respectively. First and second base mounts 242 and 246 extend in an upward direction from first and second lateral support members 230 and 234 and are designed to accept a first vertical load support 250 and a second vertical load support 254, respectively. First vertical load support 250 pivotally attaches to first base mount 242 at pivot point 258, wherein pivot point 258 comprises means for pivotally coupling first vertical load support 250 to first base mount 242, which may comprise any device or assembly commonly known in the art capable of allowing first vertical load support 250 and first base mount 242 to pivot respect to one another. In the present embodiment, means for pivotally coupling comprises a pin connector capable of engaging first vertical load support 250 and first base mount 242. In a similar manner, second vertical load support 254 pivotally couples to second base mount 246 via pivot point 262, which also comprises means for pivoting as previously described.

Frame assembly 214 further comprises first link arm 274 and second link arm 278 that are each coupled to first vertical load support 250 and second vertical load support 254, respectively. First and second link arms 274 and 278 are joined with first and second vertical load supports 250 and 254 using first and second union members 266 and 270, respectively. First and second union members 266 and 270 are rigidly attached or fixed to the upper portions of first and second vertical load supports 250 and 254. First and second union members 266 and 270 further comprise pivot points 271 and 273, respectively, which allow the first and second link arms 274 to pivot with respect to first and second vertical load supports 250 and 254. Although first and second vertical load supports 250 and 254 extend in a substantially vertical manner from base portion 218, first and second link arms 274 and 278 extend from first and second union members 266 and 270 at an identifiable acute angle as shown in FIG. 10. Attached or coupled to first and second link arms 274 and 278, is roof support 282 that extends in a substantially horizontal manner. Roof support 282 is also pivotally coupled to first and second link arms 274 and 278 using first and second link pivot extensions 286 and 290, respectively. First and second link pivot extensions 286 and 290 each comprise a pivot point, 294 and 298, which allows first and second link arms 274 and 278 to pivot with respect to roof support 282. Roof support 282 spans substantially the entire length of tent assembly 210 and is used to support the upper portion of tent assembly 210, and particularly the material covering used to enclose the primary support structure 212 and to define the interior portion or volume of space of tent assembly 210.

Roof support 282 further comprises first transition arm engagement member 310 and second transition arm engagement member 314 located at opposing ends of roof support 282. First and second transition arm engagement members 310 and 314 are adapted to receive first transition arm 302 and second transition arm 306, respectively. First and second transition arms 302 and 306 pivotally couple to first and second link arms 274 and 278, respectively, and slide within first and second transition arm engagement members 310 and 314 as frame assembly 214 goes from its collapsed stored position as shown in FIG. 12 to its fully assembled and set-up position shown in FIG. 10. First and second transition arms 303 and 306 further comprise stay receiver 410 at the end opposite of where first and second stay receivers 302 and 304 pivotally couple to first and second link arms 374 and 378. Stay receiver 410 is adapted to receive one or more stay extensions designed to provide upward lateral support to a tent covering. Stay extensions are described in greater detail below.

As previously stated, frame assembly 214 is designed so that each of the components described above are capable of collapsing upon themselves as shown in FIG. 12. Furthermore, as frame assembly 214 is designed to go from a stored collapsed position to an upright and fully assembled position as shown in FIG. 10, frame assembly 214 further comprises means for facilitating set-up of frame assembly 214. Specifically, means for facilitating set-up of frame assembly 214 comprises a series of lift assisting devices shown as first, second, and third lift assisting devices 342, 346, 366, and 370 pivotally attached or coupled to the primary components of frame assembly 214, such that frame assembly 214 comprises a plurality of biased components. In the embodiment shown in FIG. 10, first lift assisting device 342 is pivotally attached to base portion 218 at pivot point 378, as well as to first vertical load support 250 at pivot point 374 as shown in FIG. 10. Likewise, second lift assisting device 346 is pivotally attached to base portion 218 at pivot point 386, as well as second vertical load support 254 at pivot point 382. In a similar manner, third lift assisting device 366 is pivotally attached to the first link on 274 at pivot point 354 and roof support 282 and pivot point 350; while fourth lift assisting device 370 is pivotally attached to second link arm 278 at pivot point 362, as well as to roof support 282 at pivot point 358. Each of first, second, third, and fourth lift assisting devices 342, 346, 366, and 370 function to aid in the set-up of frame assembly 214, and specifically to assist frame assembly 214 from going from its stored collapsed position to its fully-assembled set-up position. In the embodiment shown in each of the figures herein, first, second, third, and fourth lift assisting devices 342, 346, 366, and 370 comprise a pneumatic or hydraulic piston cylinder or ram or similar lifting device commonly known in the art. In function, each of these lifting devices assist the user in transitioning tent assembly 210 into its fully set-up position by providing a calculated amount of bias to each of the components of frame assembly 214. In essence, these lift assisting devices provide much of the work required to lift each of the components comprising tent assembly 210. Each of the lift assisting devices are actuated as the entire tent assembly 210 is initially lifted by the user from its collapsed position. After initiation of the lifting process, each lift assisting device helps to raise the tent to its fully assembled, set-up position. These lift assisting devices also provide support to tent assembly 210 as it is being transitioned from its set-up position to its collapsed position by absorbing or carrying much of the load or weight of tent assembly 210 so that it does not crash down upon itself, but instead may be lowered into its stored, collapsed position in a smooth manner.

As can be seen from each of the arrows in FIG. 10, frame assembly 214 and each of the primary components are designed to collapse upon themselves as stated above. Specifically, FIG. 11 shows frame assembly 214 in an interim state between its collapsed stored position and its fully assembled set-up position. FIG. 11 illustrates the direction each of first and second vertical support members 250 and 254, as well as first and second link arms 274 and 278, first and second transition arms 302 and 306, and roof support 282 fold or collapse upon themselves in relation to base portion 218. Specifically, FIG. 11 illustrates how first and second vertical load supports 250 and 254 pivot in an inward and downward manner towards base portion 218, while first and second link arms 274 and 278 pivot in an inward upward manner towards roof support 282. Moreover, first and second transition arms 302 and 306 pivot in an upward manner towards roof support 282 while sliding within first and second transition arm engagement members 310 and 314, respectively.

With reference to FIG. 12, shown in frame assembly 214 in its fully collapsed stored position, it can be seen that each of the components of frame assembly 214 are carefully designed so that they may collapse upon one another to form a low profile stored position for frame assembly 214. As can be seen, first and second vertical load supports 250 and 254 are directly adjacent to base portion 218 directly atop first and second vertical load supports 250 and 254 are first and second transition arms 302 and 306 followed by first and second link arms 274 and 278, and finally followed by roof support 282. The particular fold or collapse of each of the components of frame assembly 214 may be described as in-line, meaning that each primary component folds or collapses upon one another within the same frame. This in-line style of folding or collapsing provides significant advantages in that a simple yet highly functional tent assembly is provided for. Unlike prior art tent assemblies in which there are several components and support members that are independent of one another and are coupled together to form an assembled frame and tent assembly, the present invention tent assembly comprises components that function together as a substantially entire unit. Not only is the present invention tent assembly provide the advantage over prior art tent assemblies in that each of the primary components are largely dependent upon each other, the tent assembly of the present invention also is capable of being set up or going from a stored collapsed position to a fully upright and set-up position in significantly less time than prior art tent assemblies. Indeed, once placed in utility tow trailer 10, tent assembly 210 is capable of being fully set-up in a matter of seconds.

Figure 13:
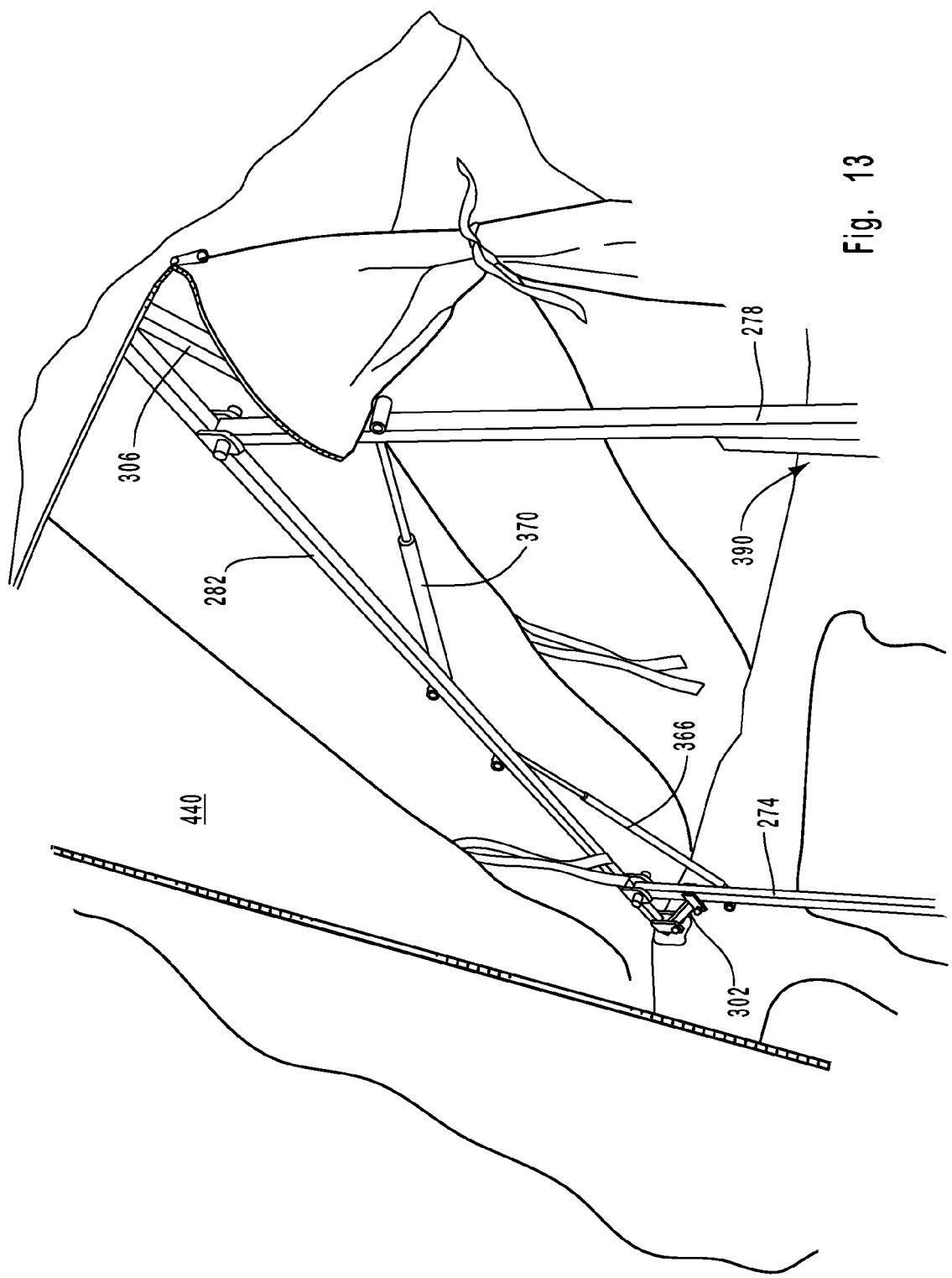
FIG. 13 illustrates a detailed view of a portion of the primary support structure, and particularly the frame assembly, of the tent assembly as attached to a tent covering according to one embodiment of the present invention.

FIG. 13 illustrates primary support structure 212 as it is used to support tent covering 440. As can be seen, tent assembly 210 is designed to comprise an interior or a volume of space defined by primary support structure 212 and tent covering 440. In the preferred embodiment shown in FIG. 13, tent covering 440 attaches to primary support structure 212 at each of the opposing ends of roof support 282, wherein first and second stay extensions (not shown), which extend in an outward manner from each end of roof support 282, provide the necessary upward lateral support to tent covering 440.

With reference to FIG. 14, shown is an up close detailed view of the upper portion of frame assembly 214 comprising second link arm 278, roof support 282, fourth lift assisting device 370, and second transition arm 306. Specifically, FIG. 14 shows this upper portion of frame assembly 214 in a partially collapsed position. In this position, tent assembly 210 is basically limp and tension-free. However, as tent assembly 210, and particularly primary support structure 212, is lifted into place by the user, second link arm pivots or rotates in the direction of the arrow shown in FIG. 14, thus causing second transition arm 306 to slide within second transition arm engagement member 314 located on the end of roof support 282 and to subsequently apply an upward and outward force upon tent covering 440, thereby providing sufficient tension to tent covering 440 as needed. Second transition arm 306 is coupled at one end to second link arm 278 as shown with the opposing end of second transition arm 306 extends through an aperture 442 located within tent covering 440 and couples to stay receiver 410 (not shown) located on the outside of tent covering 440.

FIG. 14 also illustrates fourth lift assisting device 370. Again, as tent assembly 210 and primary support structure 212 are lifted by the user, each of the lift assisting devices help to provide some of the necessary work required to lift primary support structure 212 into position. In FIG. 14, fourth lift assisting device 370 functions to push roof support 282 into position as second link arm 278 rotates or pivots in the direction of the arrow as shown. The unique configurational design shown in FIG. 14 allows tent assembly 210 to be quickly transitioned from a stored collapsed state to a fully assembled and set-up state with minimal effort by the user.

Figure 15B:
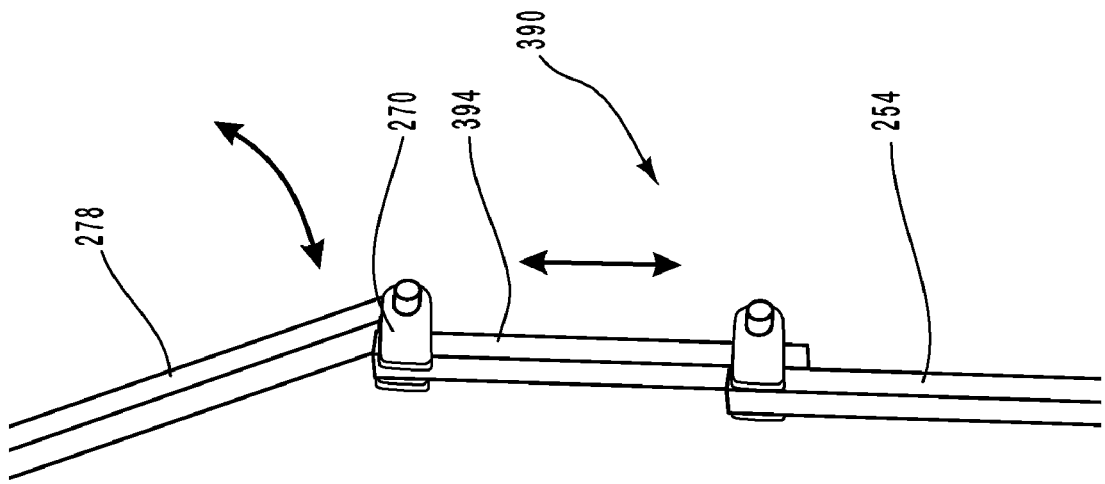
FIG. 15-A illustrates means for locking tent assembly in a locked position, and namely the quick release mechanism slidably attached to the frame assembly as tent assembly and the quick release mechanism are in a released position.
Figure 15A:
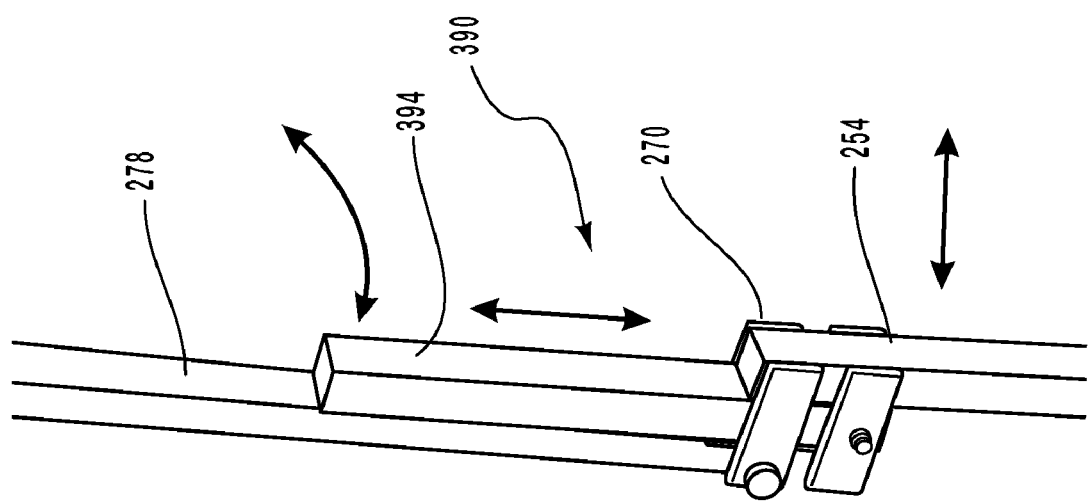

FIGS. 15-A and 15-B illustrate quick release mechanism 390 comprised of a slide arm 394 capable of sliding in a bi-directional manner. One of the unique aspects of tent assembly 210 is its ability to transition from a collapsed stored position to a fully assembled and set-up position in only a matter of seconds. As part of its design that enables tent assembly 210 to achieve or provide quick and efficient set-up, tent assembly 210 comprises the in-line configuration of its primary components as described above. Two of these primary components are first and second vertical load supports 250 and 254 as they are pivotally coupled or joined to first and second link arms 274 and 278. In FIG. 15, second vertical load support 254 and second link arm 274 are shown coupled to second union member 270 wherein second link arm 278 and second vertical load support 254 pivot about each other at pivot point 273. As tent assembly 210 is lifted from its collapsed stored position, second vertical load support 254 pivots or rotates in an outward and upward manner away from base portion 218, while second link arm 278 pivots or rotates in an downward and outward manner away from roof support 282 as shown in FIGS. 10 and 11. As tent assembly 210 approaches its fully set-up and erect position, and wherein second vertical load support 254 and second link arm 278 are in their fully extended positions, shown in FIG. 15-A, tent assembly 210 reaches a toggle point wherein second vertical load support 254 and second link arm 278 are pushed past this toggle point at which time tent assembly 210 is in a substantially locked position as shown in FIG. 15-B. This same occurrence takes place with first vertical load support 250 and first link arm 274 on the opposing side of tent assembly 210.

Once tent assembly 210 is in its substantially locked position past the toggle point, quick release mechanism 390 is actuated, as also shown in FIG. 15-B. Quick release mechanism 390, and specifically slide arm 394, is coupled to second link arm 278 such that it may be slid in a bi-directional manner down second link arm 278 and over second union member 270. In this position, quick release mechanism 390 prevents second vertical load support 254 and second link arm 278 from pivoting about pivot point 273 towards and past the toggle point as identified and discussed above, wherein tent assembly 210 is released from its locked position. In addition, quick release mechanism 390 secures tent assembly 210 from any inadvertent or unintentional release.

In order to release tent assembly 210 from its locked position, quick release mechanism 390, and particularly slide arm 394, is simply deactuated by sliding slide arm 394 upwards along second link arm 278 and past second union member 270. Once quick release mechanism 390 is deactuated, second vertical load support 254 and second link arm 278 may be pivoted or rotated about pivot point 273 towards and past the toggle point, wherein tent assembly 210 is allowed to collapse to its stored position. One ordinarily skilled in the art will recognize that several different devices or assemblies exist that may be used as the means for locking tent assembly 210 in its locked position. As such, quick release mechanism 390 is intended merely as an exemplary means for locking tent assembly 210 in its locked position, and should not be construed as limiting in any way.

Figure 16:
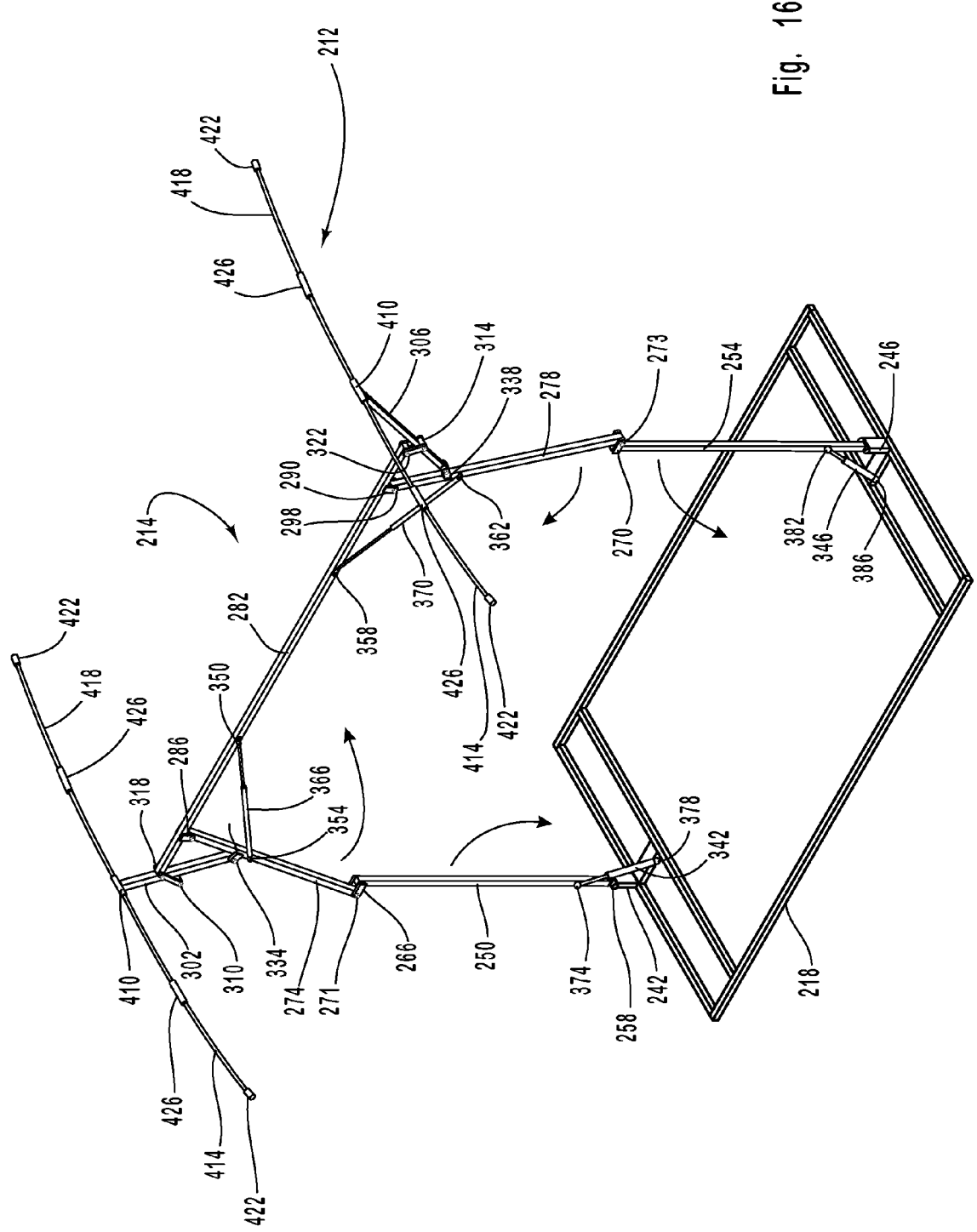
FIG. 16 illustrates a perspective view of the primary support structure comprising the frame assembly and the several stay extensions releasably coupled to the frame assembly and used to support the tent covering.

With reference to FIG. 16, shown is a perspective view of primary support structure 212. Specifically, what is shown is frame assembly 214, as well as first stay extension 414 and second stay extension 418 extending outwardly in opposing directions from stage receiver 410 as attached to first and second transition arm 302 and 306, respectively. First and second stay extensions 414 and 418 function to provide upward lateral support to a tent covering wherein each of first and second stay extensions 414 and 418 are removably coupled to a portion of the tent covering in order to provide sufficient support. In a preferred embodiment, first and second stay extensions 414 and 418 are fed through one or more looped sleeves located on the tent covering as commonly known in the art. FIG. 16 also shows first and second stay extensions 414 and 418 comprising hinged joints 426 wherein each of first and second stay extensions 414 and 418 are allowed to fold or collapse upon themselves. Furthermore, end caps 422 may be added or placed upon each end of stay extensions 414 and 418 for various safety and aesthetic purposes.

Figure 17:
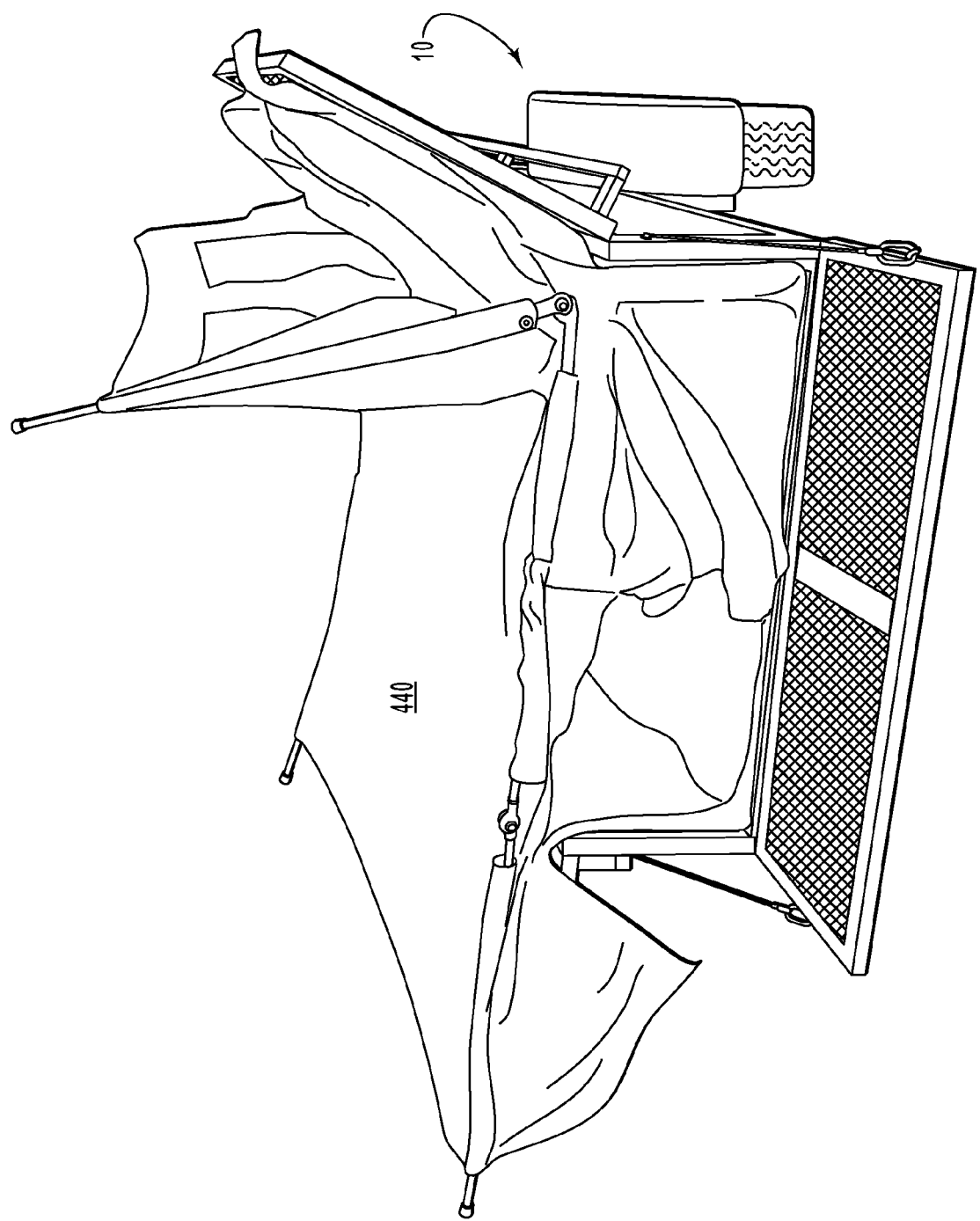
FIG. 17 illustrates the foldability or collapsibility and storage ability of the tent assembly into the interior trailer bed portion of the combination utility/camper trailer with all component parts of the tent assembly intact.

FIG. 17 illustrates the versatility of the present invention tent assembly 210. Specifically, FIG. 17 illustrates how the entire tent assembly 210 may be folded upon itself and placed within the interior trailer bed 14 of utility/tow trailer 10. FIG. 17 also illustrates how tent covering 440 may remain attached to primary structural support 212 in both the collapsed stored position and fully assembled upright position of tent assembly 210. Stated differently, it is not necessary for tent covering 440 to be removed in order to transition tent assembly 210 from its fully assembled upright position to its stored position within tow utility trailer 10. This unique advantage further contributes to the ease, efficiency, and quick set-up of tent assembly 210. Another advantage is the ability to transition tent assembly 210 from its fully set-up position to a collapsed stored position and to store the entire tent assembly 210 in a sack-like container or carry case that may be pulled in and out of tow/utility trailer 10 as needed. For example, although tow/utility trailer 10 may be used in a utility manner as described above, utility/tow trailer 10 may be converted to a sleeping trailer simply by positioning tent assembly 210 as it is contained within its sack-like container within trailer bed 14 of tow/utility trailer 10, where it may be stored and transported within trailer bed 14 to a desired location. As needed, first and second configurable panel members 50 and 56 may be rotated to their sleep functioning configurations, at which time tent assembly 210 may be removed from its sack-like container and set up in a manner as described above.

Figure 18:
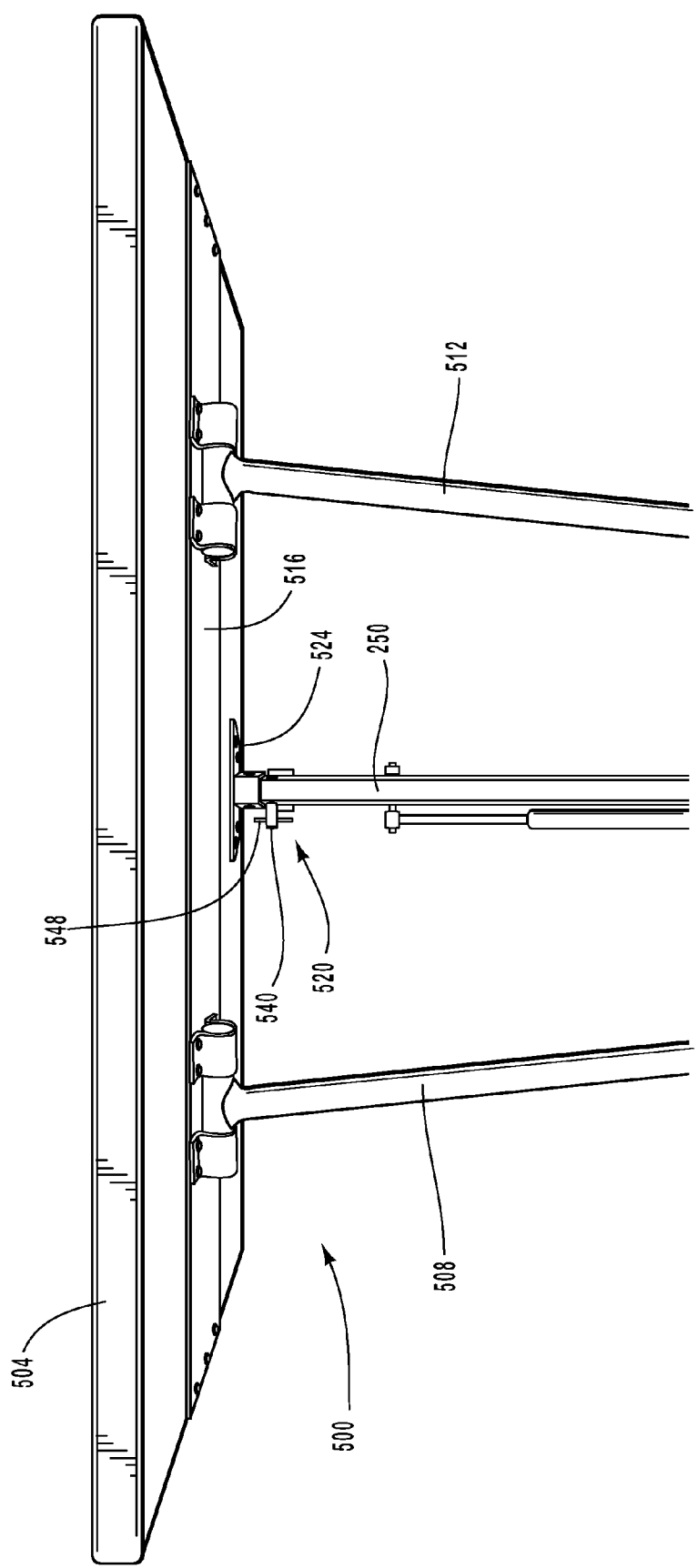
FIG. 18 illustrates the table assembly in its set-up usable position according to one embodiment of the present invention.
Figure 19:
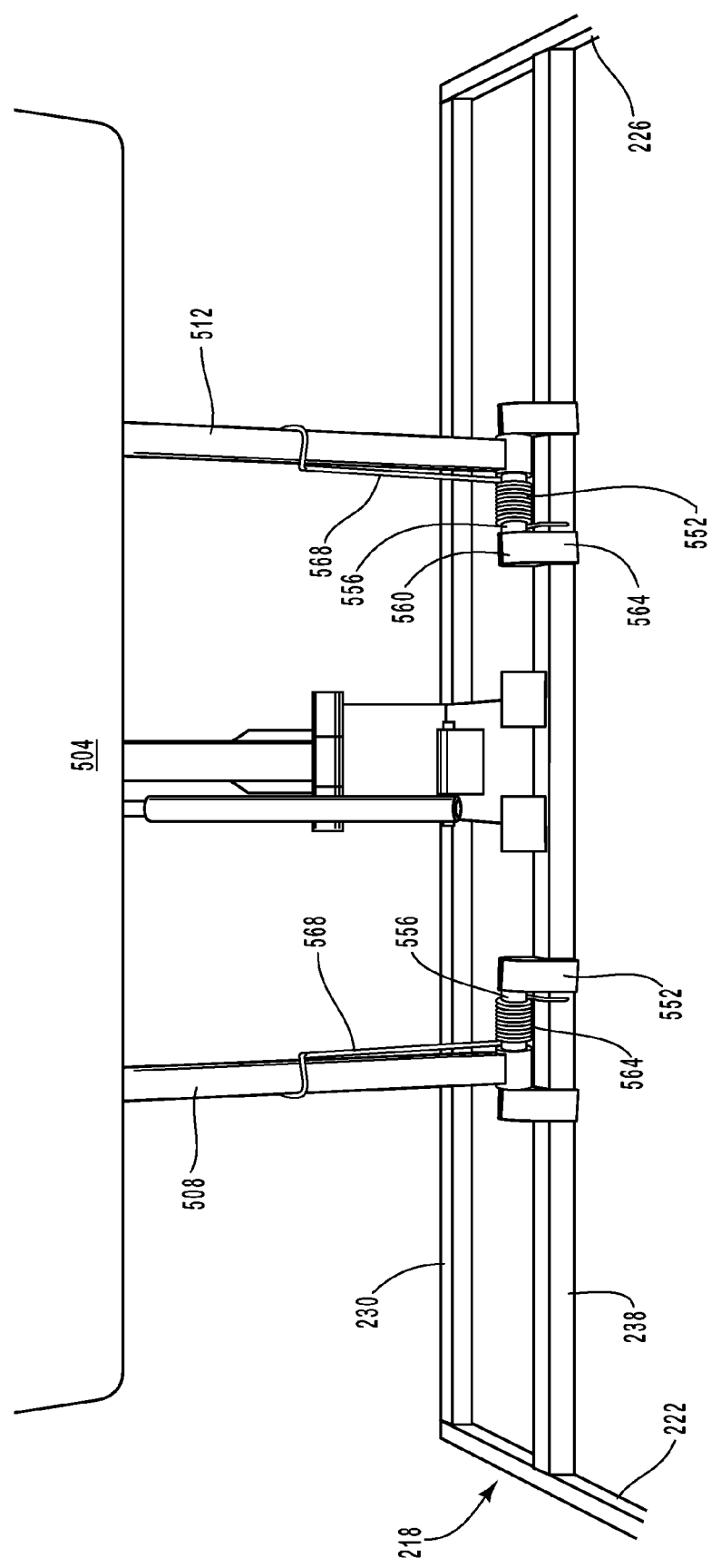
FIG. 19 illustrates the table assembly in a released position where the table portion of the table assembly is allowed to rotate or pivot into a substantially vertical or upright position according to one embodiment of the present invention.

Referring to FIGS. 18 through 21, the present invention further features table assembly 500. Table assembly 500 comprises a table 504 and first and second leg supports 508 and 512 which pivotally couple to table 504 as well as pivotally couple to lateral mount support 238 of base portion 218 of frame assembly 214 of tent assembly 210. FIG. 18 shows table assembly 500 in a set up position wherein first vertical leg support 250 comprises a table secure 536 securely coupled thereon. Table secure 536 further comprises bracket 544, pin 540, and locking means 548 (e.g. a cotter pin, etc.), each used to engage frame engagement means 520, which is securely coupled to table 504 as shown. Frame engagement means comprises bracket 524 and a pair of extending arms 528 having an aperture 532 therein capable of receiving or accepting pin 540 of frame engagement means 520. In this manner, table 504 is releasably coupled to first vertical leg support 250 of frame assembly 214. FIG. 18 also shows how first and second leg supports 508 and 512 are pivotally coupled to 504, thus allowing table 504 to pivot in a downward direction as shown in FIG. 19.

Figure 20:
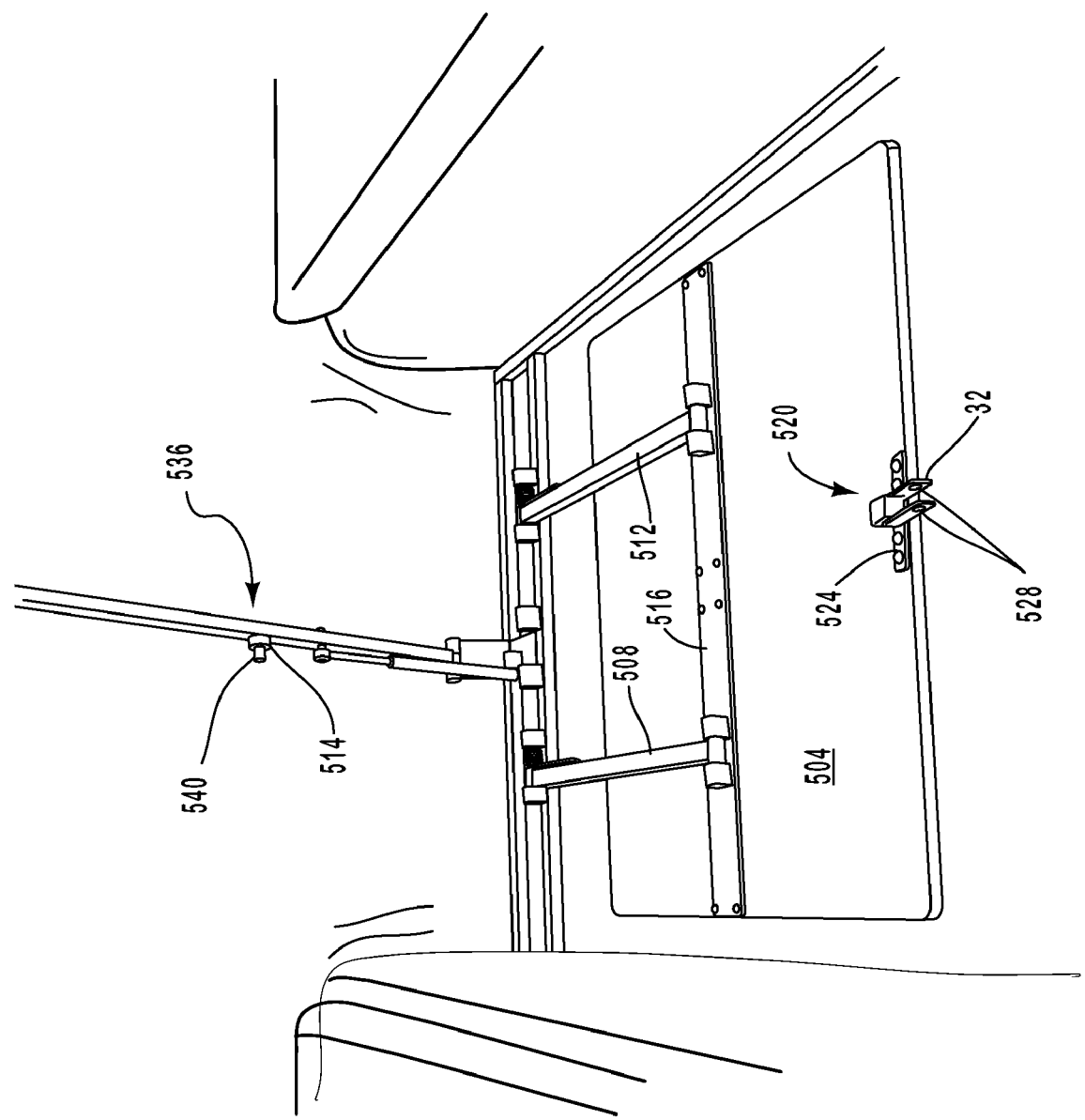
FIG. 20 illustrates the table assembly in a released position and as it is folded down into the base portion of the frame assembly.

With reference to FIG. 19, first and second leg supports 508 and 512 are pivotally coupled to lateral mount support 238 of frame assembly 214 as shown. Specifically, lateral mount support 238 comprises extension members 552 having apertures 560 therein which are capable of receiving pins 556. Pins 556 serve to engage extension members 552 and first and second leg supports 508 and 512, such that first and second leg supports 508 and 512 are allowed to pivot or rotate with respect to lateral mount support 238. In this manner, table 504 is allowed to pivot in a downward direction and rest within the interior of base portion 218 between first and second longitudinal support members 222 and 226 as shown in FIG. 20.

FIG. 19 also illustrates biasing means 564 comprising leg engagements 568 which couple to first and second leg supports 508 and 512. The function of biasing means 564 is to provide lift support to table 504 so that it is facilitated in transitioning from its start position as shown in FIG. 20 to its assembled position shown in FIG. 18. Biasing 564 comprises a calculated amount of force to enable it to assist the set-up of table 504.

Figure 21:
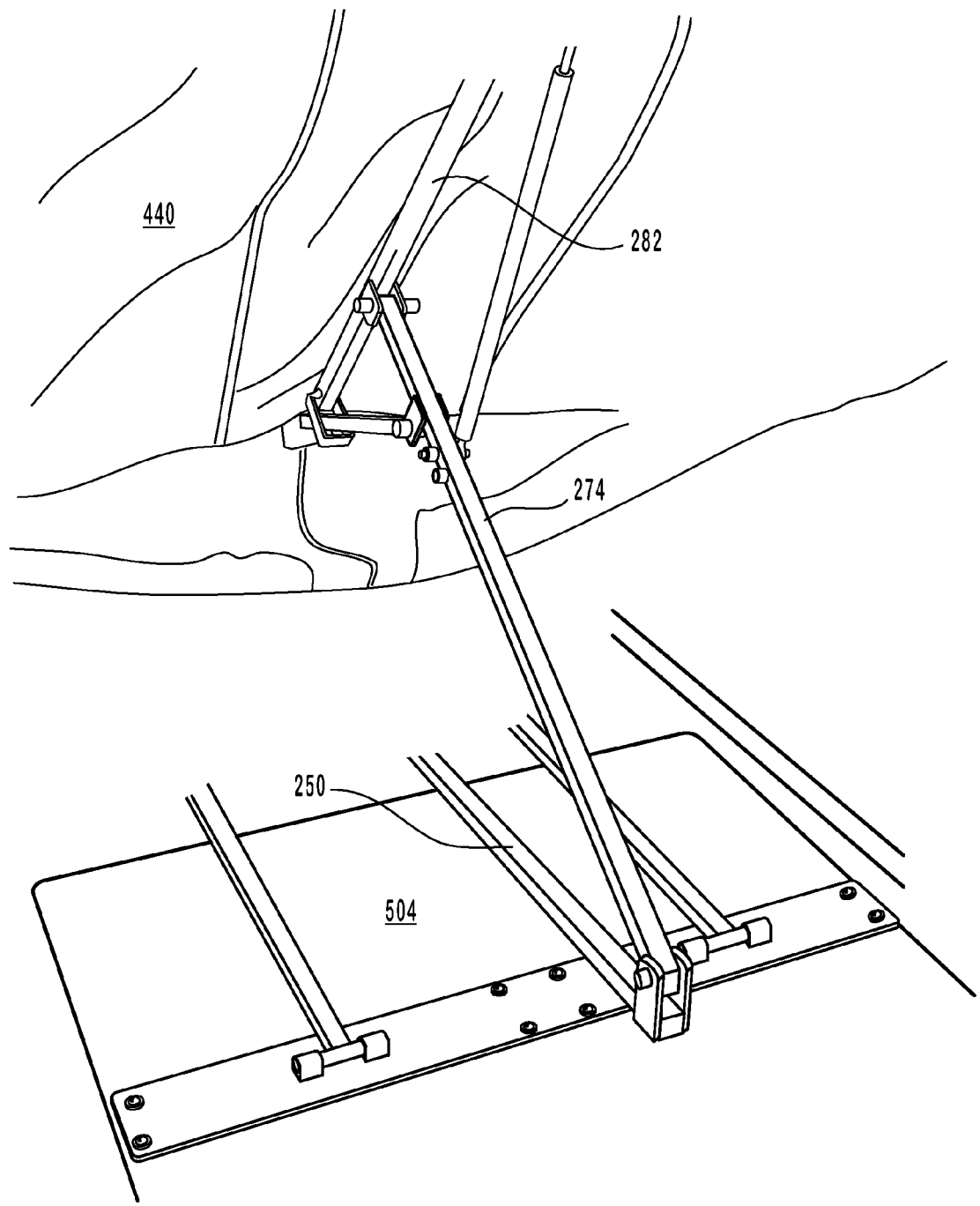
FIG. 21 illustrates the table assembly in a released and folded down position, wherein the tent assembly is allowed to collapse unobstructed upon the table assembly.
Figure 22:
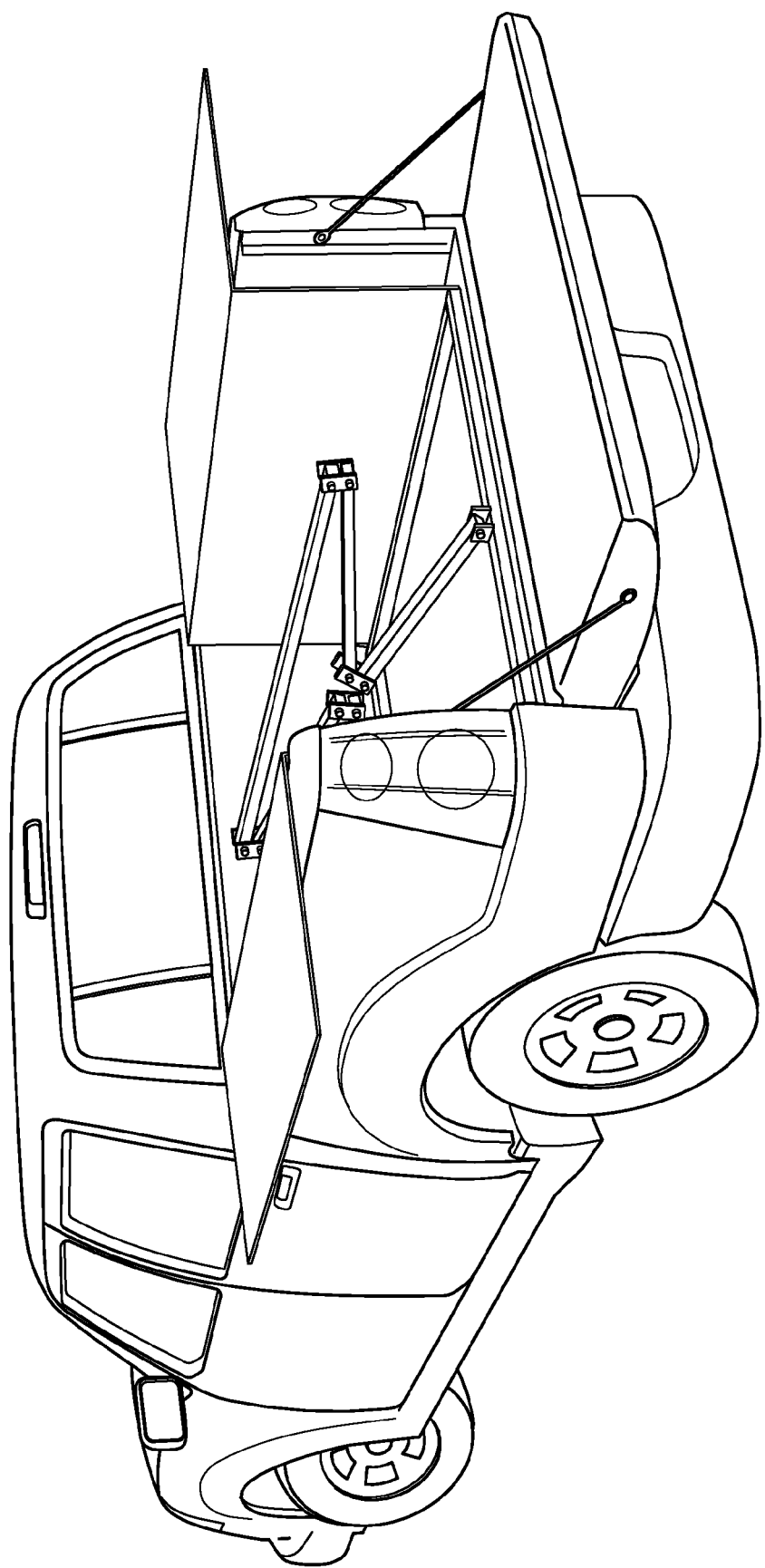
FIG. 22 illustrates a tent assembly including a box assembly removably fittable within the bed of a truck.
Figure 23:
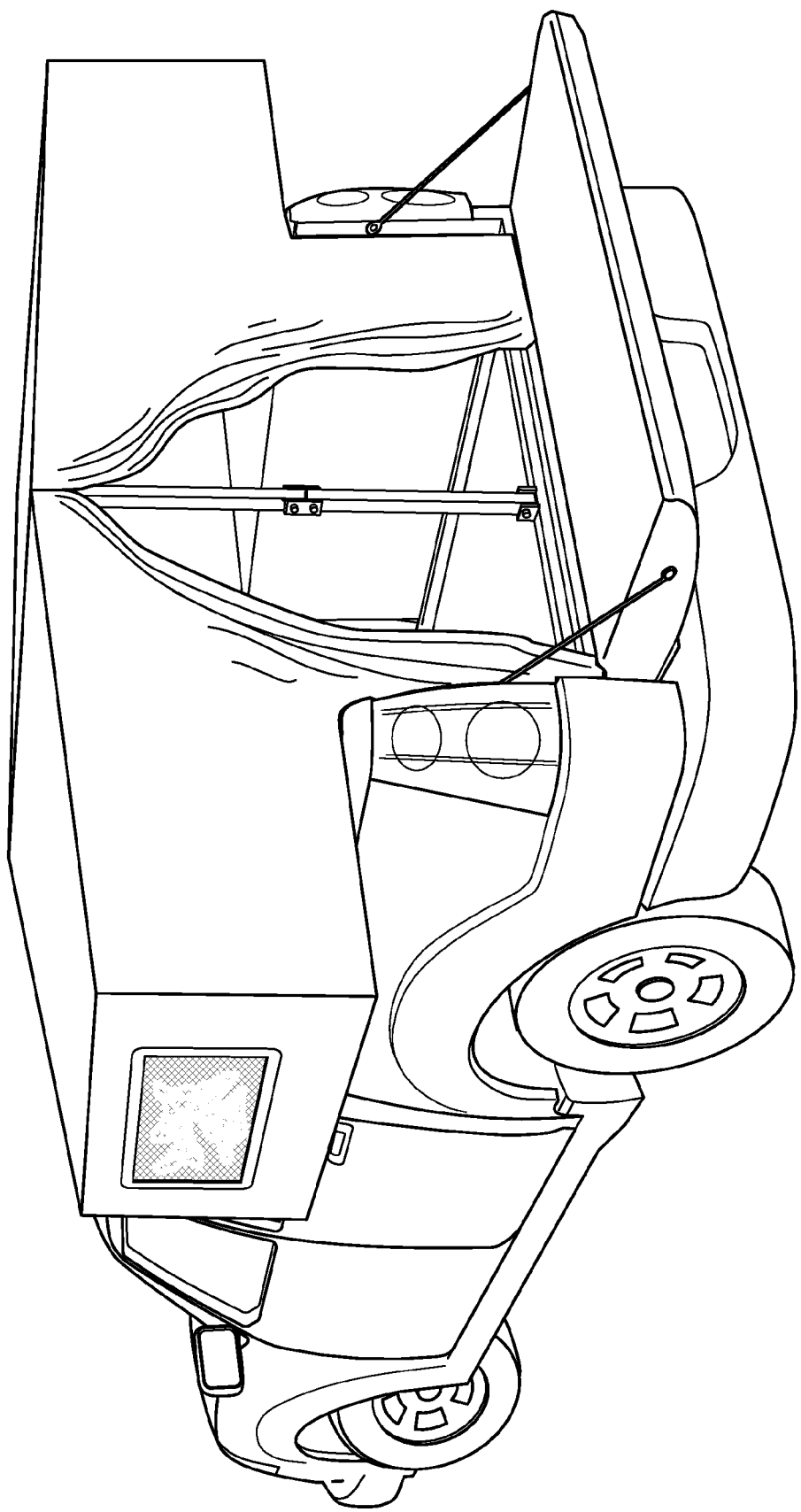
FIG. 23 illustrates the tent assembly of FIG. 22 in its raised position.

FIG. 21 illustrates table assembly 500, and particularly table 504 in its stored position within base portion 218. FIG. 21 also illustrates the ability of frame assembly 214 to collapse upon itself with no obstruction or interference from table assembly 500. In essence, table assembly 500 is capable of being stored while still attached to frame 214 without obstructing and interfering with the collapse and storage of frame assembly 214.

The present invention further features a method of converting a combination utility/camper trailer from a utility trailer to a camper trailer. The method comprises the steps of: coupling to the combination utility/camper trailer, having an open trailer bed defined by a first side wall support, a second side wall support, and a front wall support, each extending upwards from a stationary floor, first and second configurable panel members, the first and second configurable panel members coupled to the first and second side wall supports, respectively; positioning the combination utility/camper trailer in a first utility functioning configuration, the first utility functioning configuration defined by the first and second configurable panel members being positioned in a substantially horizontal position extending inward from the first and second side wall supports, respectively, the first and second configurable panel members positioned in the first utility functioning position capable of providing a load bearing surface to the combination utility/camper trailer; and converting the combination utility/camper trailer from the first utility functioning configuration to a sleep functioning configuration via repositioning means, the sleep functioning configuration defined by the first and second configurable panel members being positioned in a substantially horizontal position extending outward from the first and second side wall supports, respectively, the first configurable panel member defining a first sleeping area and the second configurable panel member defining a second sleeping area, the repositioning means capable of facilitating cyclical conversion of the first and second configurable panel members between the first utility functioning configuration and the sleep functioning configuration.

The method further comprises the interim step of converting the combination utility/camper trailer from the first utility functioning configuration or the sleep functioning position to a second utility functioning configuration via the repositioning means, wherein the second utility functioning position is defined by the first and second configurable panel members being positioned in a substantially vertical position such that they extend upward from the first and second side wall supports, respectively, the first and second configurable panel members positioned in the second utility functioning position capable of providing an increased interior volume to the trailer bed.

The present invention further features a method of converting a combination utility/camper trailer from a utility trailer to a camper trailer. The method comprises the steps of: coupling to the combination utility/camper trailer, having an open trailer bed defined by a first side wall support, a second side wall support, and a front wall support, each extending upwards from a stationary floor, first and second configurable panel members, the first and second configurable panel members coupled to the first and second side wall supports, respectively; positioning the combination utility/camper trailer in a first utility functioning configuration, the first utility functioning configuration defined by the first and second configurable panel members being positioned in a substantially horizontal position extending inward from the first and second side wall supports, respectively, the first and second configurable panel members positioned in the first utility functioning position capable of providing a load bearing surface to the combination utility/camper trailer; and converting the combination utility/camper trailer from the first utility functioning position to a sleep functioning position, wherein the sleep functioning configuration is defined by the first and second configurable panel members being positioned in a substantially horizontal position extending outward from the first and second side wall supports, respectively, the first configurable panel member defining a first sleeping area and the second configurable panel member defining a second sleeping area. This sleep functioning configuration is designed to provide a tent assembly and an enclosed sleeping area.

The present invention further features a method for converting a utility space into a sleeping area, wherein the method comprising the steps of: (a) obtaining a collapsible tent assembly as stored within a carry case, wherein the tent assembly itself comprises: a primary support structure collapsible upon itself for storage and easy transport, and a tent covering capable of fitting over the primary support structure to comprise an enclosed interior of the tent assembly; (b) placing the collapsible tent assembly in a utility space capable of receiving the tent assembly; and (c) lifting up on a portion of the primary support structure to actuate one or more biased support members coupled thereon, and to transition the tent assembly from its stored collapsed position to a fully assembled, set-up position. The method further comprises the steps of: (d) locking the tent assembly in its fully assembled, set-up position using means for locking; (e) transitioning the tent assembly from its fully assembled, set-up position to its collapsed, stored position by unlocking the tent assembly and pulling down on the primary support structure until the tent assembly collapses upon itself, wherein this step of transitioning is performed with the tent assembly in a substantially assembled and intact state; and (f) supplying a table assembly that is removably coupled to the primary support structure and that folds up and down out of the way as needed without interfering with the collapsible nature of the tent assembly.

Although the present invention describes the tent assembly in conjunction with utility/camper trailer 10 as disclosed herein, the tent assembly of the present invention is not limited to this type of trailer. Indeed, the present invention tent assembly is adaptable for use with any utility space, including various vehicles or structures, such as different types of trailers, truck beds, closets, etc., as long as an adequate sleeping area is provided for by the utility space. As such, the tent assembly system and method is not intended to be limiting in any way. The inventive concept is the ability to provide a removable tent assembly and structure that is fittable with some type of utility space, that can be collapsed upon itself for storage, and that is easily set up according to the assembly as taught herein. For example, the tent assembly could be adapted to fit a truck bed. In this design, tent assembly would only need to provide an enclosed area equivalent to the size of the interior of the truck bed.

The present invention may be embodied in other specific forms without departing from its spirit of essential characteristics. The described embodiments are to be considered in all respects only al illustrative and not restrictive. The scope of the invention is, therefore, indicated by the appended claims, rather than by the foregoing description. All changes which come within the meaning and range of equivalency of the claims are to be embraced within their scope.

What is claimed and desired to be secured by Letters Patent is:

1. A combination utility/camper trailer comprising:
    a floor;
    a support wall assembly comprising a first side wall support, a second side wall support, and a front wall support, each extending upwards from one or more perimeter portions of said floor, said support wall assembly defining a perimeter, said floor and said support wall assembly defining an open trailer bed having an interior storage area;
    a first configurable panel member attached to said first side wall support;
    a second configurable panel member attached to said second side wall support;
    repositioning means for at least partly securing said first and second configurable panel members to said first and second side wall supports, respectively, and facilitating the repositioning of said first and second configurable panel members between a first utility functioning position forming a utility deck whereon a motorized vehicle can be placed, a second utility functioning position, and a sleep functioning position;
    a wheel assembly coupled to said combination utility/camper trailer;
    a hitch assembly coupled to said combination utility/camper trailer for removably coupling said combination utility/camper trailer to a motorized vehicle; and
    a tent assembly capable of being removably coupled to said combination utility/camper trailer in said sleep functioning position to provide an enclosed sleeping area, said tent assembly comprising a plurality of biased frame members having a covering attached thereto that spring from a stored position within said interior portion of said trailer into a fully set-up position when said trailer is in said sleep functioning position.

2. The combination utility/camper trailer of claim 1, wherein said first and second side wall supports and said front wall support each extend up from respective perimeter side and front sections of said floor, said second side wall support offset from said first side wall support in an opposing and complimentary relationship, said front wall support connected to said first and second side wall supports in a substantially perpendicular manner.

3. The combination utility/camper trailer of claim 2, wherein said support wall assembly further comprises a rear wall support extending up from a perpendicular rear section of said floor and connected to said first and second side wall supports in a substantially perpendicular manner, said rear wall support offset from said front wall support in an opposing and complimentary relationship.

4. The combination utility/camper trailer of claim 1, wherein said first utility functioning position is defined by said first and second configurable panel members being positioned in a substantially horizontal position extending inward from said first and second side wall supports, respectively, to be within said perimeter, and supported by said first and second side wall supports and said front wall support, said first and second configurable panel members positioned in said first utility functioning position such that they are capable of providing a load bearing surface.

5. The combination utility/camper trailer of claim 1, wherein said second utility functioning position is defined by said first and second configurable panel members being positioned in a substantially vertical position such that they extend upward from said first and second side wall supports, respectively, said first and second configurable panel members positioned in said second utility functioning position capable of providing an increased interior volume to said trailer bed.

6. The combination utility/camper trailer of claim 1, wherein said sleep functioning position is defined by said first and second configurable panel members being positioned in a substantially horizontal position extending outward from said first and second side wall supports, respectively, and without said perimeter, said first configurable panel member defining a first sleeping area, and said second configurable panel member defining a second sleeping area.

7. The combination utility/camper trailer of claim 1, further comprising means for retaining said first and second configurable panel members to provide support for such in said sleep functioning position.

8. The combination utility/camper trailer of claim 7, wherein said means for retaining comprises a retaining system extending from each of said first and second configurable panel members, said retaining system comprising a plurality of extensions that extend substantially perpendicularly from a surface of said configurable panel members and that are used to support a retaining rail in a position offset from said configurable panel members, said retaining system providing load bearing support to said configurable panel members in their horizontally oriented said sleep functioning position, said retaining system brought into contact with first and second side wall supports upon positioning said configurable panel members in said sleep functioning position.

9. The combination utility/camper trailer of claim 1, further comprising one or more brace supports to stabilize and support said first and second configurable panel members in said sleep functioning position.

10. The combination utility/camper trailer of claim 9, wherein each of said brace supports comprises a first end attached to a trailer attachment located on said trailer bed and a second end attached to a configurable panel member attachment located on each of said first and second configurable panel members.

11. The combination utility/camper trailer of claim 1, further comprising a center support member for supporting a portion of said first and second configurable panel members in said first utility functioning position.

12. The combination utility/camper trailer of claim 1, further comprising securing means for securing said first and second configurable panel members in any of said first and second utility functioning positions and said sleep functioning position.

13. The combination utility/camper trailer of claim 1, wherein said repositioning means comprises a hinge assembly coupling said first and second configurable panel members to said first and second side wall supports, respectively, and supporting, at least in part, said first and second configurable panel members in their positioned configurations.

14. The combination utility/camper trailer of claim 1, wherein said repositioning means comprises a channel assembly coupling said first and second configurable panel members to said first and second side wall supports, respectively, and allowing said first and second configurable panel members to be repositioned such that said trailer is capable of achieving said first and second utility functioning positions and said sleep functioning position.

15. The combination utility/camper trailer of claim 1, wherein said first and second configurable panel members further comprise padding means thereon for providing a suitable sleeping surface while said trailer is in said sleep functioning configuration.

16. The combination utility/camper trailer of claim 1, wherein said utility/camper trailer further comprises additional removably coupled retaining system that may be coupled to said utility/camper trailer when in said first utility functioning position to provide lateral support for any loads being carried by said utility/camper trailer.

17. A combination utility/camper trailer comprising:

an open trailer bed defined by a first side wall support, a second side wall support, and a front wall support, each extending upwards from a stationary floor;

first and second complimentary configurable panel members coupled to first and second side wall supports, respectively, said first and second configurable panel members allowing said combination utility/camper trailer to convert between a first utility functioning configuration defined by said first and second configurable panel members being positioned in a substantially horizontal position extending inward from said first and second side wall supports, respectively, to be within said perimeter, said first and second configurable panel members positioned in said first utility functioning position capable of providing a reinforced load bearing surface; a second utility functioning configuration defined by said first and second configurable panel members being positioned in a substantially vertical position such that they extend upward from said first and second side wall supports, respectively, said first and second configurable panel members positioned in said second utility functioning position capable of providing an increased interior volume to said trailer bed; and a sleep functioning configuration defined by said first and second configurable panel members being positioned in a substantially horizontal position extending outward from said first and second side wall supports, respectively, and without said perimeter, said first configurable panel member defining a first sleeping area, and said second configurable panel member defining a second sleeping area; and repositioning means for facilitating cyclical repositioning of said first and second configurable panel members between said first and second utility functioning configurations, and said sleep functioning configuration.

18. A method of converting a combination utility/camper trailer from a utility trailer to a camper trailer, said method comprising the steps of:

coupling to said combination utility/camper trailer, having an open trailer bed defined by a first side wall support, a second side wall support, and a front wall support, each extending upwards from a stationary floor, first and second configurable panel members, said first and second configurable panel members coupled to said first and second side wall supports, respectively;

positioning said combination utility/camper trailer in a first utility functioning configuration, said first utility functioning configuration defined by said first and second configurable panel members being positioned in a substantially horizontal position extending inward from said first and second side wall supports, respectively, said first and second configurable panel members positioned in said first utility functioning position capable of providing a utility deck whereon at least one motorized vehicle can be secured to said combination utility/camper trailer; and converting said combination utility/camper trailer from said first utility functioning configuration to a sleep functioning configuration via repositioning means, said sleep functioning configuration defined by said first and second configurable panel members being positioned in a substantially horizontal position extending outward from said first and second side wall supports, respectively, said first configurable panel member defining a first sleeping area and said second configurable panel member defining a second sleeping area, said repositioning means capable of facilitating cyclical conversion of said first and second configurable panel members between said first utility functioning configuration and said sleep functioning configuration.

19. The method of claim 18, further comprising an interim step of converting said combination utility/camper trailer from said first utility functioning configuration to a second utility functioning configuration via said repositioning means, wherein said second utility functioning position is defined by said first and second configurable panel members being positioned in a substantially vertical position such that they extend upward from said first and second side wall supports, respectively, said first and second configurable panel members positioned in said second utility functioning position capable of providing an increased interior volume to said trailer bed, wherein said first and second configurable panel members are secured with a securing means and a securing mechanism.

20. The method of claim 18, further comprising the step of supporting and carrying an identifiable load on said dynamic floor assembly in said first utility functioning configuration.

21. The method of claim 18, further comprising the step of removably coupling a tent assembly to said combination utility/camper trailer in said sleep functioning configuration to create an enclosed sleeping area, said first configurable panel member defining a first sleeping area and said second configurable panel member defining a second sleeping area, said tent assembly comprising a plurality of biased frame members having a covering attached thereto that spring from a stored position within said interior portion of said trailer into a fully set-up position when said trailer is in said sleep functioning position.

22. The method of claim 18, further comprising the step of converting said combination utility/camper trailer from said sleep functioning configuration back to said first utility functioning configuration via repositioning means.

23. A combination utility/camper trailer comprising:
a first floor;
a support wall assembly comprising a first side wall support, a second side wall support, and a front wall support, each extending upwards from one or more perimeter portions of said floor, said support wall assembly defining a perimeter, said floor and said support wall assembly defining an open trailer bed having an interior cargo space area;
at least one configurable panel member attached to said first side wall support;
at least one configurable panel member attached to said second side wall support opposite said at least one configurable panel member attached to said first side wall support, said configurable panel members forming a second floor substantially equal to said first;
repositioning means for at least partly securing said configurable panel members to said first and second side wall supports, respectively, and facilitating the repositioning of said configurable panel members between a first utility functioning position, a second utility functioning position, and a sleep functioning position;
a wheel assembly coupled to said combination utility/camper trailer; and
a hitch assembly coupled to said combination utility/camper trailer for removably coupling said combination utility/camper trailer to a motorized vehicle.

24. A box frame assembly removably fittable within the bed of a truck, said frame assembly comprising:
a base portion;
at least two opposing wall supports extending from and securely coupled to said base portion;
at least one configurable panel member attached to a first wall support;
at least one complimentary configurable panel member attached to a second wall support opposite said at least one configurable panel member attached to said first wall support; and
repositioning means for at least partly securing said configurable panel members to said first and second wall supports, respectively, and facilitating the repositioning of said configurable panel members between a first utility functioning position, a second utility functioning position wherein said configurable panel members are secured by a securing means and a securing mechanism, and a sleep functioning position.

25. The frame assembly of claim 24 further comprising a tent assembly capable of being removably coupled to said frame assembly in said sleep functioning position to provide an enclosed sleeping area, said tent assembly comprising a plurality of biased frame members having a covering attached thereto that spring from a stored position into a fully set-up position when said fame assembly is oriented in said sleep functioning position.

* * * * *